(12) United States Patent
Yun et al.

(10) Patent No.: US 8,849,454 B2
(45) Date of Patent: Sep. 30, 2014

(54) HUMANOID ROBOT PUSH RECOVERY ON LEVEL AND NON-LEVEL GROUND

(75) Inventors: Seungkook Yun, Cupertino, CA (US); Ambarish Goswami, Fremont, CA (US); Sung-Hee Lee, Gwangju (KR)

(73) Assignee: Honda Motor Co., Ltd., Tokyo (JP)

( * ) Notice: Subject to any disclaimer, the term of this patent is extended or adjusted under 35 U.S.C. 154(b) by 240 days.

(21) Appl. No.: 13/425,383

(22) Filed: Mar. 20, 2012

(65) Prior Publication Data

US 2012/0245734 A1    Sep. 27, 2012

Related U.S. Application Data

(60) Provisional application No. 61/454,933, filed on Mar. 21, 2011.

(51) Int. Cl.
*B25J 9/16* (2006.01)
*B62D 57/032* (2006.01)

(52) U.S. Cl.
CPC .............. *B62D 57/032* (2013.01); *Y10S 901/01* (2013.01)
USPC .............................................. 700/253; 901/1

(58) Field of Classification Search
CPC ...... B62D 57/032; B62D 57/00; B62D 57/02; B62D 57/022; B62D 57/024; G06N 3/008; B25J 11/00; B25J 19/0091; B25J 9/0006
USPC ............. 700/250, 253, 254, 258; 318/568.12; 901/1, 50
See application file for complete search history.

(56) References Cited

U.S. PATENT DOCUMENTS 5,357,433 A    10/1994    Takenaka et al.
(Continued)

FOREIGN PATENT DOCUMENTS

WO    WO 2005/098733    10/2005

OTHER PUBLICATIONS

Kajita, S. et al., "Balancing a Humanoid Robot Using Backdrive Concerned Torque Control and Direct Angular Momentum Feedback," *Proceedings of the 2001 IEEE International Conference on Robotics & Automation*, May 21-26, 2001, pp. 3376-3382, Seoul, Korea.

(Continued)

*Primary Examiner* — Jason Holloway
(74) *Attorney, Agent, or Firm* — Fenwick & West LLP; Mark Duell

(57) ABSTRACT

A robot controller controls a robot to maintain balance in response to an external disturbance (e.g., a push) on level or non-level ground. The robot controller determines a predicted stepping location for the robot such that the robot will be able to maintain a balanced upright position if it steps to that location. As long as the stepping location predicted stepping location remains within a predefined region (e.g., within the area under the robot's feet), the robot will maintain balance in response to the push via postural changes without taking a step. If the predicted stepping location moves outside the predefined region, the robot will take a step to the predicted location in order to maintain its balance.

16 Claims, 16 Drawing Sheets

(56) References Cited

U.S. PATENT DOCUMENTS

| | | | |
|---|---|---|---|
| 7,313,463 B2 | 12/2007 | Herr et al. | |
| 7,949,430 B2* | 5/2011 | Pratt et al. | 700/253 |
| 8,352,077 B2* | 1/2013 | Goswami et al. | 700/263 |
| 8,554,370 B2* | 10/2013 | Goswami et al. | 700/253 |
| 2004/0162636 A1* | 8/2004 | Hattori et al. | 700/245 |
| 2008/0133053 A1* | 6/2008 | Pratt et al. | 700/245 |
| 2008/0133055 A1 | 6/2008 | Hasegawa | |
| 2009/0132087 A1* | 5/2009 | Pratt et al. | 700/258 |
| 2009/0321150 A1 | 12/2009 | Kwon et al. | |
| 2010/0161120 A1* | 6/2010 | Goswami et al. | 700/245 |
| 2010/0161126 A1* | 6/2010 | Goswami et al. | 700/255 |

OTHER PUBLICATIONS

McGrath, S. et al., "Model-Free Active Balancing for Humanoid Robots," *Proceedings of the 12$^{th}$ Annual RoboCup International Symposium*, Jul. 15-18, 2008, pp. 544-555, Suzhou, China.

PCT International Search Report and Written Opinion, PCT Application No. PCT/US2012/029848, Jun. 7, 2012, nine pages.

Wight, D., "A Foot Placement Strategy for Robust Bipedal Gait Control: A thesis presented to the University of Waterloo in fulfillment of the thesis requirement for the degree of Doctor of Philosophy in Systems Design Engineering," 2008, two hundred ten pages, Waterloo, Ontario, Canada.

\* cited by examiner

HUMANOID ROBOT PUSH RECOVERY ON LEVEL AND NON-LEVEL GROUND

RELATED APPLICATIONS

This application claims priority from U.S. provisional application No. 61/454,933 entitled "Momentum-Based Reactive Stepping Controller on Level and Non-Level Ground for Humanoid Robot Push Recovery" filed on Mar. 21, 2011, the content of which is incorporated by reference herein in its entirety.

BACKGROUND

1. Field of the Invention

The present invention relates to robotics and, more specifically, to a balance controller for controlling a humanoid robot.

2. Description of the Related Arts

For humanoid robots to operate in the real world where they can work and/or live together with humans, the ability to recover from unexpected external disturbances such as a push is highly desirable. Without the ability to maintain balance, robots are highly susceptible to damage to themselves and to humans or objects around them. While some prior works attempt to provide a control framework to enable a robot to achieve balance control, these traditional models are often imprecise and fail to perform at the level desired. Furthermore, traditional balance controllers fail to control the robot's motions in a manner that is sufficiently human-like. Finally, traditional balance controllers are limited to flat ground, and are unable to achieve balance maintenance on ground that is non-level and/or non-stationary.

SUMMARY

In a first embodiment, a computer-implemented method controls a humanoid robot to maintain balance in response to an external disturbance. A robot controller receives state information of the humanoid robot. The robot controller determines a predicted stepping location of the robot based on the state information of the humanoid robot. The predicted stepping location comprising a location such that the humanoid robot will maintain balance if it steps to the predicted stepping location. Responsive to the predicted stepping location falling within a predefined region, the robot controller controls the robot to make a postural change without stepping to maintain balance in response to the external disturbance. Responsive to the predicted stepping location falling outside the predefined region, the robot controller instead controls the robot to take a step to the predicted stepping location to maintain balance in response to the external disturbance. Thus, the robot can beneficially maintain balance in response to an external disturbance by either making a postural adjustment or taking a step.

In a second embodiment, a computer-implemented method determines a stepping location on non-level ground for a humanoid robot to maintain balance in response to an external disturbance. The humanoid robot is modeled as a rimless wheel model. The rimless wheel model has a point mass corresponding to the center of mass of the humanoid robot, a first spoke corresponding to a first leg of the humanoid robot, and a second spoke corresponding to a second leg of the humanoid robot. A plane on which the rimless wheel model resides is determined based on a direction of the humanoid robot's center of mass projected onto the non-level ground. An anchor point for the rimless wheel model is determined based on the center of pressure of the humanoid robot. A dynamic model is applied to model motion of the rimless wheel through the plane about the anchor point. Based on the modeled motion, the robot controller selects which of a first section of the non-level ground and a second section of non-level ground to step to, where the first section of the non-level ground has a first slope and the second section of the non-level ground has a second slope. The stepping location is determined based on the selected section of the non-level ground such that the point mass of the rimless wheel model will come to rest above the stepping location after executing the modeled motion.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Figure 1A:
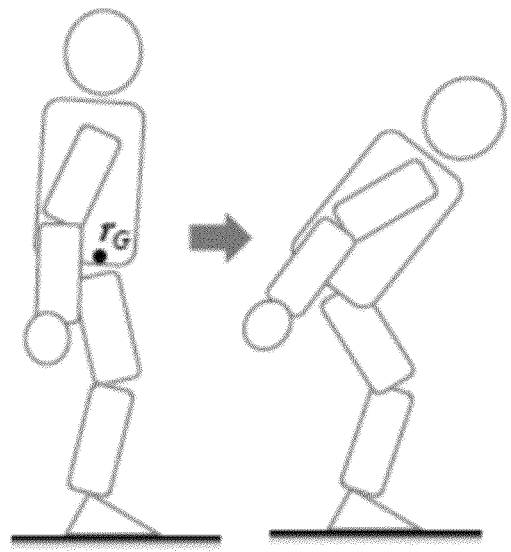
FIG. 1A is a diagram illustrating a postural response of the robot to maintain balance following a forward push in accordance with an embodiment of the invention.

Embodiments are now described with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm.

It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments are intended to be illustrative, but not limiting, of the scope of the embodiments, which are set forth in the claims.

Overview

Figure 1B:
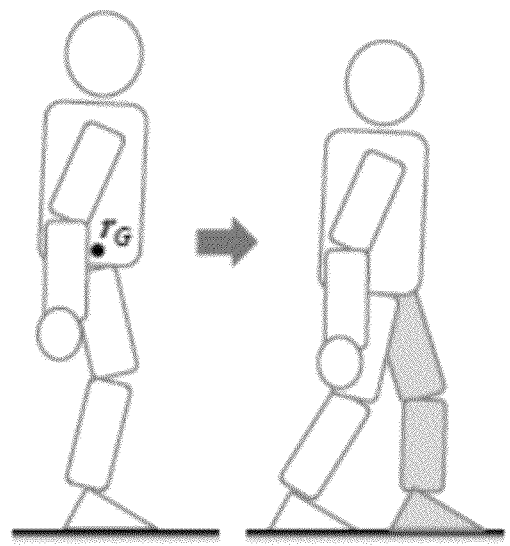
FIG. 1B is a diagram illustrating a stepping response of the robot to maintain balance following a forward push in accordance with an embodiment of the invention.

A robot controller controls motion of a robot to maintain balance in response to external disturbances such as a push. By regulating motion of the robot, the robot controller can selectively encourage the robot to recover its balance either with or without taking a step. FIGS. 1A-1B illustrate two different ways in which the robot can recover from a push. In FIG. 1A, the robot controller fully respects the linear momentum of the robot while compromising the angular momentum (if needed). This results in postural balance change in which the robot rotates its body in response to the push to maintain balance without stepping. In FIG. 1B, the robot instead respects the angular momentum while compromising linear momentum (if needed). This results in a stepping motion of the robot allowing it to maintain balance without changing its posture. Under different conditions, the robot controller determines which balance control technique to employ, thereby enabling human-like balance recovery in response to an external perturbation.

System Architecture

Figure 2:
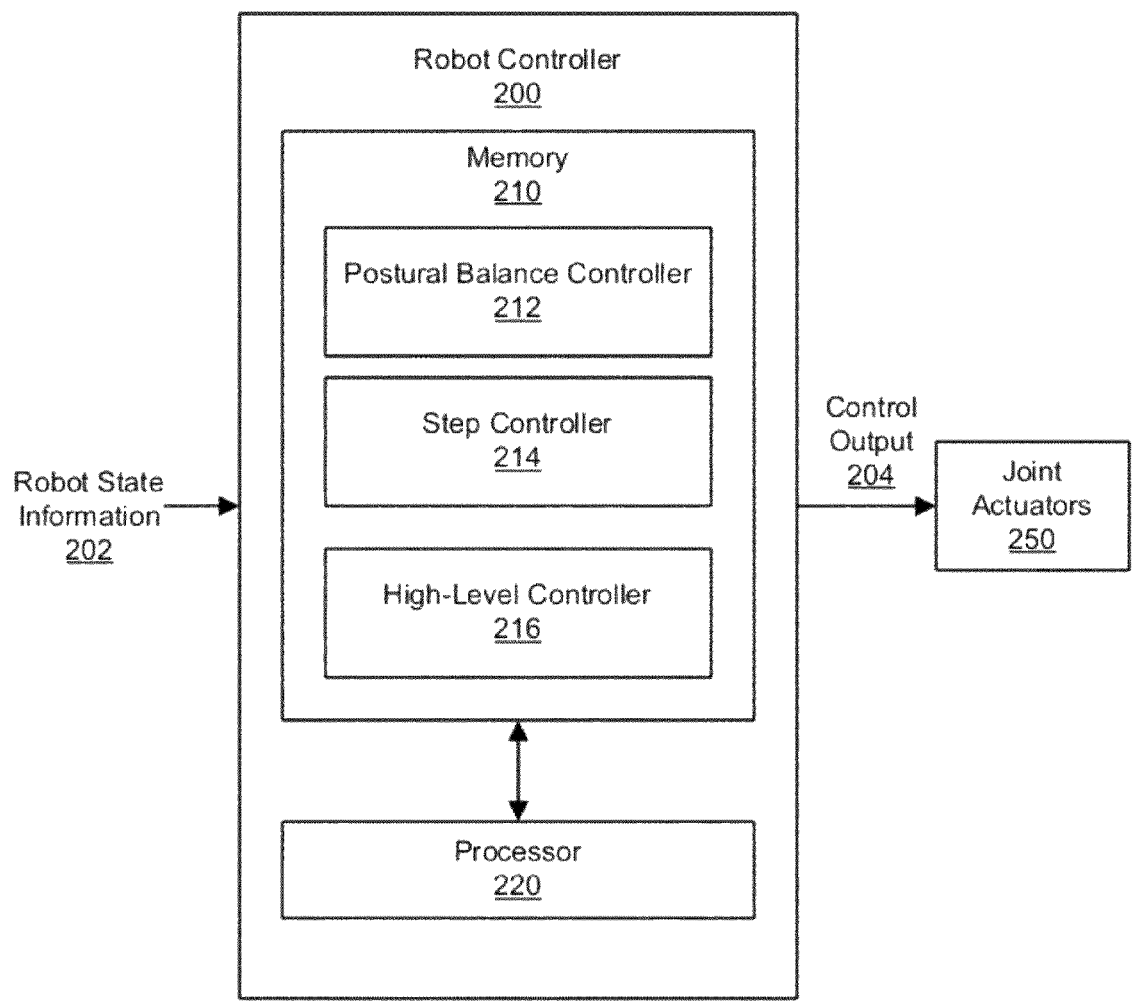
FIG. 2 illustrates a robot controller in accordance with an embodiment of the invention.

FIG. 2 is a block diagram illustrating an embodiment of a robot controller 200 for controlling motion of a robot. In one embodiment, the robot is a humanoid biped robot having a human-like joint configuration (e.g., six degrees of freedom in each leg and a total mass of between 40 and 60 kgs). The robot controller 200 receives state information of the robot. This state information can include both sensed information pertaining to the positions and/or velocities of different components of the robot and motion instructions (e.g., from an input controller) indicating how the robot should move. For example, the motion instructions may direct the robot to, for example, stay stationary, walk in a particular direction, move or rotate its limbs or trunk according to a particular motion, etc. These motion instructions may be irrespective of balance considerations or other physical constraints on the robot. Such motion instructions may be inputted by a human through a control mechanism, or may be generated automatically by an artificial intelligence system that controls motion decisions of the robot. In one embodiment, the state information 202 is defined in terms of a motion of the feet (e.g., configuration and velocity), angular momentum about the robot's center of mass, center of mass position and velocity, and joint accelerations. In some situations, the motion instructions of the state information 202 can indicate that the robot should remain stationary (i.e., the desired angular momentum and center of mass velocity should ideally be zero).

Based on the state information 202, the robot controller 200 generates a control output 204 that controls joint actuators 250 which cause the robot to move. For example, the robot may rotate portions of its body or take a step in order to execute a motion as close as possible to the robot's motion instructions while still retaining balance. In one embodiment, the control output 204 comprises a vector of joint torques indicating the torques that the actuators will apply to each of the robot's joints. If the motion instructions would not result in the robot losing balance based on the sensed data, then the control output 204 controls the joint actuators 250 to carry out the received motion instructions. On the other hand, if the robot controller 200 determines that the motion instructions would cause the robot to lose its balance and topple over given the current state information 202, the robot controller 200 generates a control output 204 such that the resulting motion (an "admissible motion") is optimally close to the desired motion while still allowing the robot to maintain balance.

In one embodiment, the robot controller 200 is able to control the robot to maintain its balance even when the robot is subjected to external perturbations (e.g., a push) or when the robot is standing or walking on a non-level and/or non-stationary surface. The robot controller 200 may process the state information 202 and generate control output 204 periodically (e.g., once every millisecond) such that the robot continuously retains its balance even as its motion instructions change or when external forces acting on the robot change. Furthermore, because the robot controller 200 can be based on a human motion model in one embodiment, the resulting motion of the robot can be human-like, i.e., the robot moves to maintain its balance in a manner similar to a human.

In one embodiment, the robot controller 200 comprises a processor 220 and a memory 210. The processor 220 processes data signals and may comprise various computing architectures such as a complex instruction set computer (CISC) architecture, a reduced instruction set computer (RISC) architecture, or an architecture implementing a combination of instruction sets. Although only a single processor 220 is shown in FIG. 2, multiple processors may be included.

The processor 220 comprises an arithmetic logic unit, a microprocessor, a general purpose computer, or some other information appliance equipped to transmit, receive and process electronic data signals from the memory 210 or from external inputs.

The memory 210 comprises a computer-readable storage medium that stores computer-executable instructions and computer-readable data. The instructions may comprise code for performing any and/or all of the techniques described herein. The memory 210 may furthermore temporarily or persistently store data inputted to the robot controller 200 (e.g., desired motion 202), data to be outputted by the robot controller 200 (e.g., control output 204), and any intermediate data used to carry out the process steps of the robot controller 200 described herein. Memory 204 may be a dynamic random access memory (DRAM) device, a static random access memory (SRAM) device, Flash RAM (non-volatile storage), combinations of the above, or some other memory device known in the art. In operation, the processor 220 loads the computer-executable instructions and/or data from the memory 210 to carry out the process steps described herein.

In one embodiment, the memory 210 stores computer-executable instructions embodied as a high-level controller 216, a postural balance controller 212, and a step controller 214. The high-level controller 116 determines whether motion of the robot is controlled by the postural balance controller 212 or the step controller 214. Generally, the high-level controller 216 gives control to the postural balance controller 212 when the high-level controller 216 determines that the robot is not taking a step and does not need to take a step to maintain balance. The high-level controller 216 generally gives control the step controller 216 when the robot is stepping or when it detects a trigger condition indicating that the robot cannot maintain balance without taking a step.

The robot controller 200 may include more or less components than those shown in FIG. 2 without departing from the scope of the present invention. For example, computer system 200 may include additional memory, such as, for example, a first or second level cache, or one or more application specific integrated circuits (ASICs). In other embodiments, the robot controller 200 may be implemented entirely in hardware.

Figure 3:
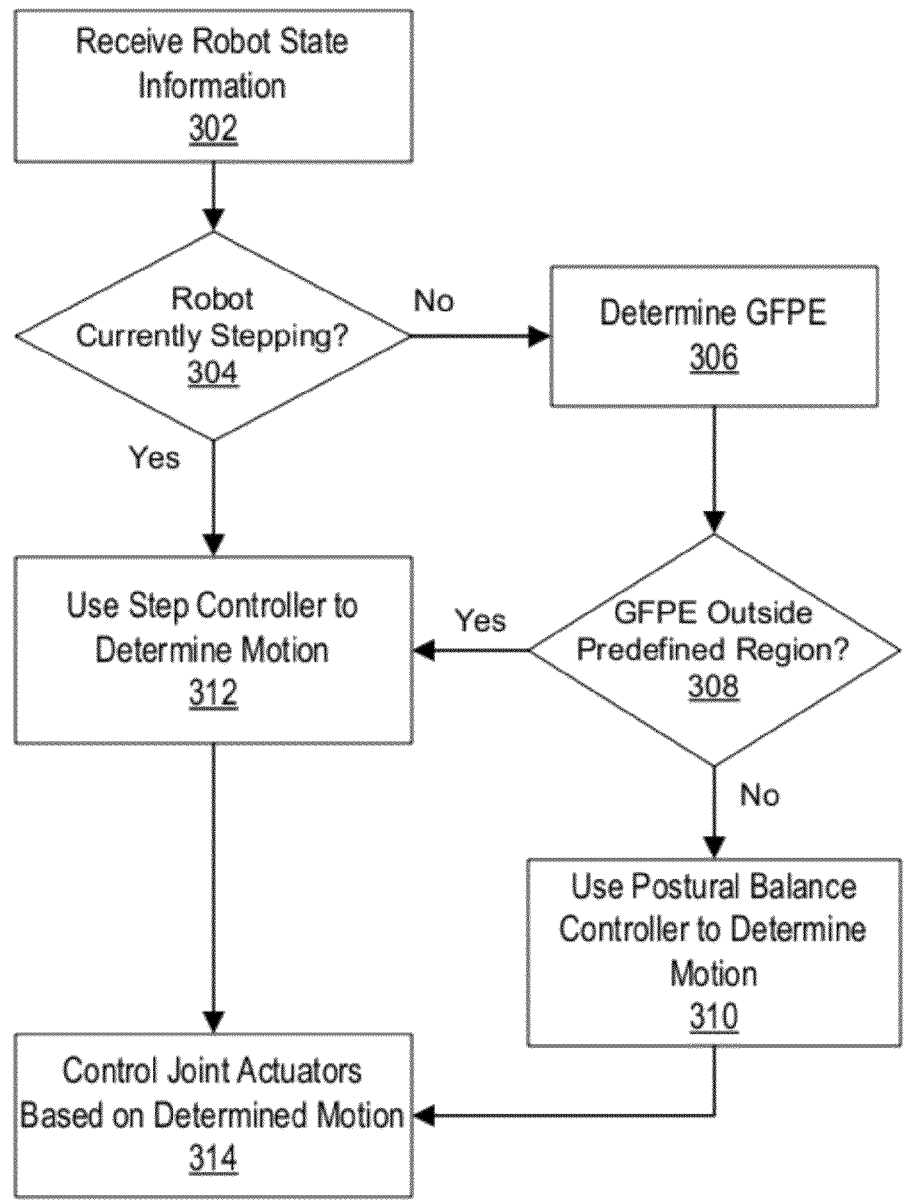
FIG. 3 is a flowchart illustrating a process for controlling a humanoid robot in accordance with an embodiment of the invention.

FIG. 3 illustrates an embodiment of a high-level process performed by the robot controller 200 for controlling a robot. The robot controller 200 receives 302 the robot state information (e.g., sensed data and current motion instructions). pertaining to the positions and/or velocities of different components of the robot. The robot controller 200 determines 304 whether the robot is currently stepping (or about to take a step). If the robot is currently stepping, the step controller 214 is used 312 to determine and control motion of the robot. Alternatively, if the robot is not currently stepping already, the robot controller 200 periodically determines 306 a generalized foot placement estimator (GFPE) based on the current dynamic state of the robot (e.g., positions and/or velocities of its joints). The GFPE represents a point on the ground surface where the robot will be in a balanced position if its foot is placed there. Generally when the robot is balanced, the GFPE will already be under the robot's CoM and therefore the robot need not take any action to retain balance. However, if the robot becomes unstable (e.g., in response to an external disturbance), the GFPE will move away from under the robot's CoM and the robot may need to take some action to retain balance, such as making a postural change (e.g., rotating about the trunk) or taking a step. Calculation of the GFPE is described in further detail below.

If the robot determines 308 that the GFPE is within a predefined region, the robot controller 200 uses 310 the postural balance controller 212 to control the motion of the robot such that the robot will retain balance and carry out a motion based on its motion instructions. If, on the other hand, the robot controller 200 determines 308 that the GFPE falls outside the predefined region, the robot controller 200 instead uses 312 the step controller 214 to cause the robot to take a step to the determined GFPE location. In one embodiment, the predefined region comprises the area under the robot's support base (e.g., its feet). The robot controller 200 then controls 314 joint actuators of the robot to achieve the determined motion provided by either the step controller 214 or the postural balance controller 212. Operation of the postural balance controller 212 and the step controller 214 are described in further detail below.

GFPE Calculation

The GFPE comprises a predicted ground location such that the robot will be able to maintain balance if it steps to the predicted location. The GFPE can exist on both level and non-level ground. In one embodiment, computation of the GFPE assumes that the ground either has a constant slope or has a single discontinuous slope change from where the robot is standing (see e.g., FIG. 9B). Furthermore, the robot has knowledge of the ground layout (e.g., the slopes and location(s) of the slope change). In one embodiment, the ground layout can be automatically detected by the robot using, for example, its computer vision system or via other sensors.

Figure 4:
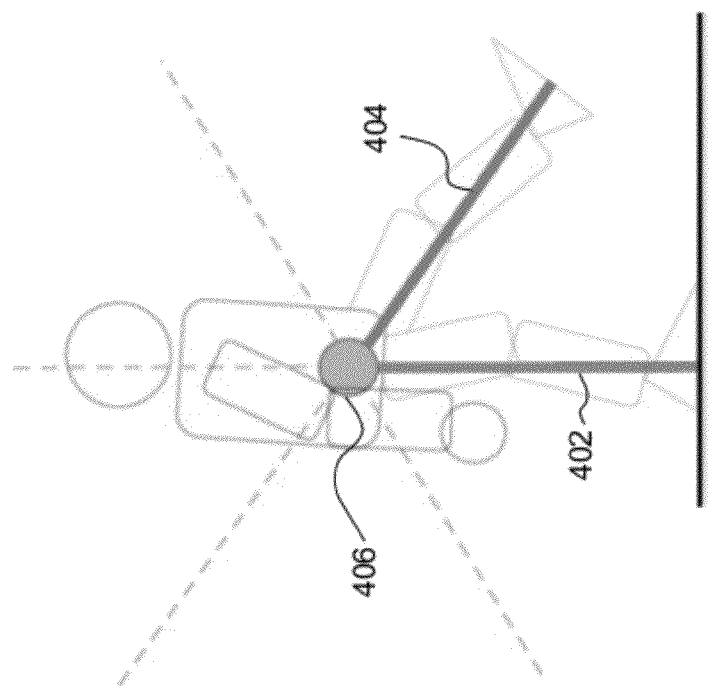
FIG. 4 is a diagram illustrating a two spoke rimless wheel model of a humanoid robot in accordance with an embodiment of the invention.

In one embodiment, the robot controller 200 determines the GFPE based on a simplified dynamic model of the humanoid robot comprising a rimless wheel with only two spokes. The rimless wheel model is illustrated in FIG. 4. The rimless wheel model has massless spokes 402, 404 of fixed length representing each of the legs of the robot. The rimless wheel model also has a point mass 406 at the center of the wheel corresponding to the CoM of the robot. In this model, the GFPE corresponds to the point on the ground where the rimless wheel model would come to a complete stop with its CoM directly above the stepping location.

Figure 5:
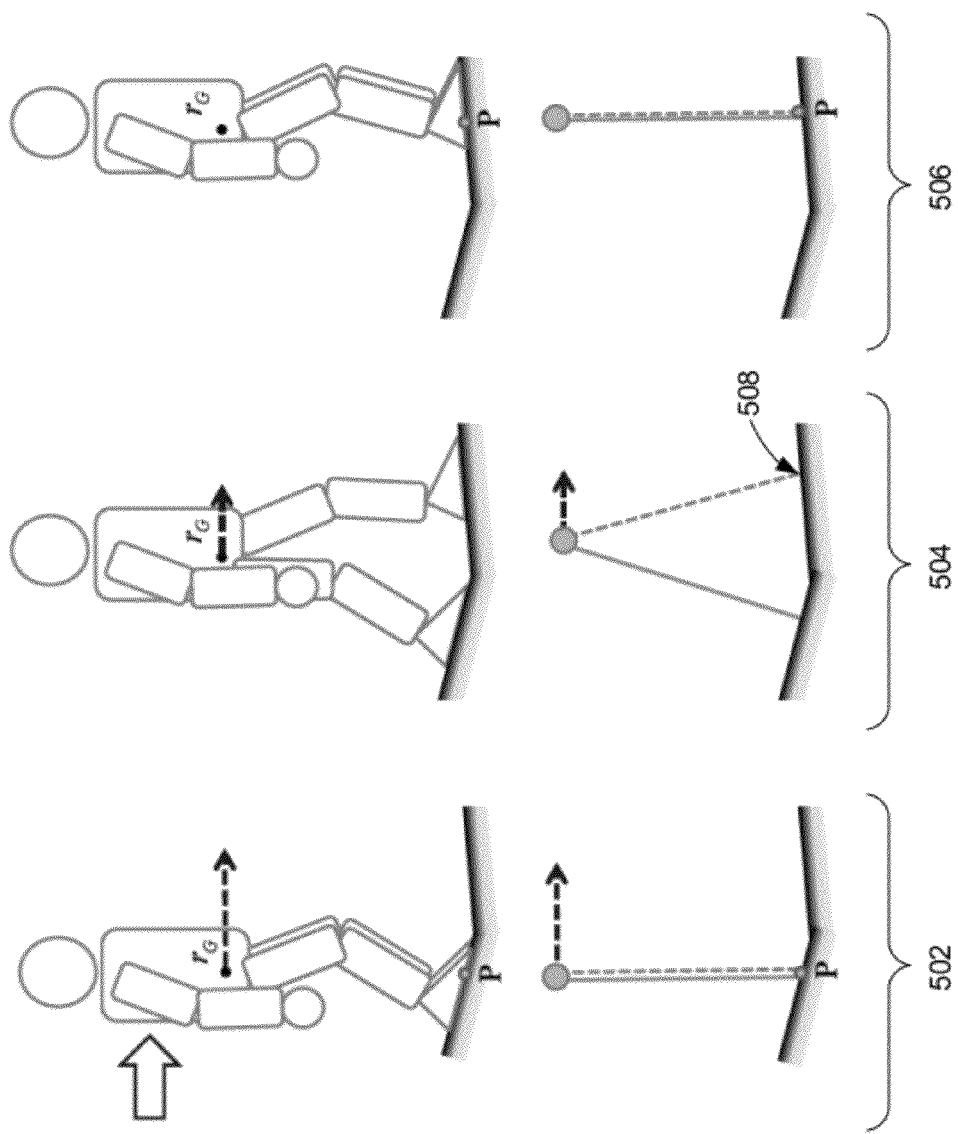
FIG. 5 is a diagram illustrating a rimless wheel model of a humanoid robot while executing a step in accordance with an embodiment of the invention.

FIG. 5 illustrates an example sequence of positions that the robot may take in response to a push and the corresponding rimless wheel model at each stage. A robot in a first position 502 is subjected to a push from behind. The robot takes a step in response to the push arriving at a second position 504 with its swing leg landing at the determined GFPE location 508. The robot then takes a follow-up step to bring the robot back to a vertically upright position 506 with its CoM above the GFPE 508. The GFPE can exist even on non-level ground. Assuming that the robot knows the ground slopes, this GFPE exists in most cases unless stepping is physically not feasible due to the fixed length of the spokes or a steep slope.

Figure 6:
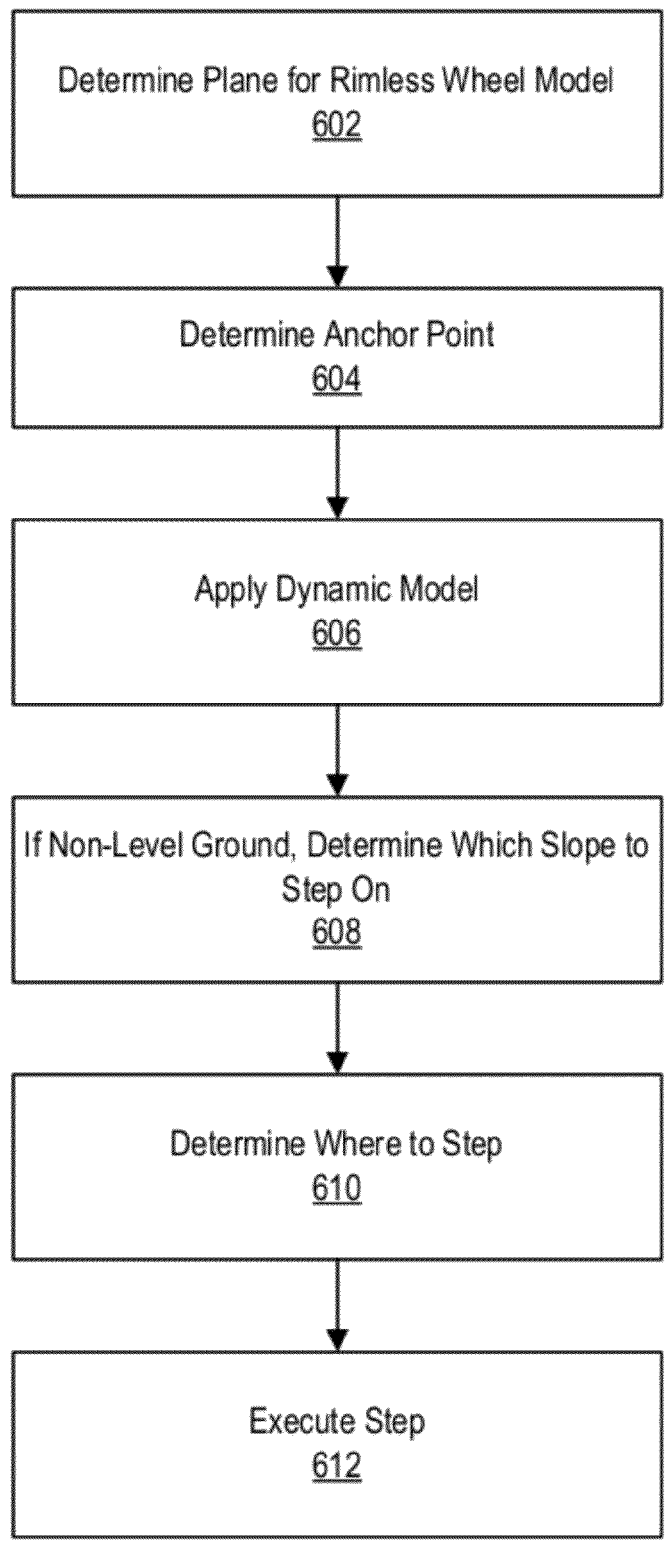
FIG. 6 is a flowchart illustrating an embodiment of a process for calculating a stepping location of a humanoid robot in accordance with an embodiment of the invention.
Figure 7:
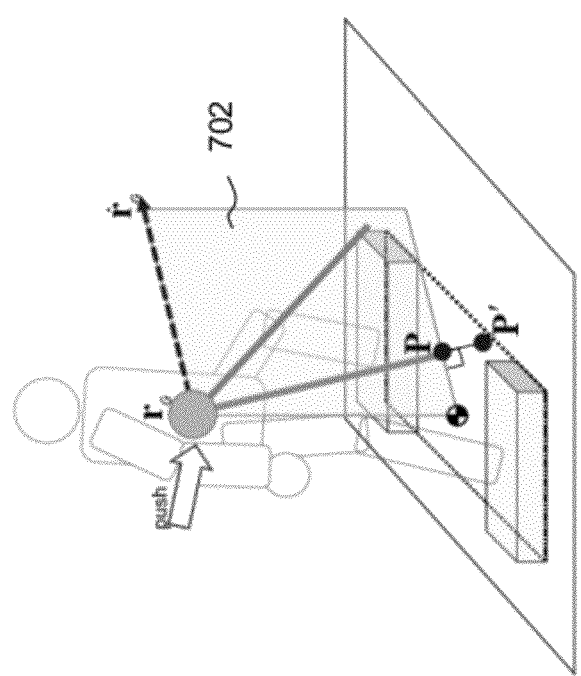
FIG. 7 is a diagram illustrating plane for determining a stepping location of a humanoid robot in accordance with an embodiment of the invention.

FIG. 6 illustrates an embodiment of a process for determining the GFPE based on the rimless wheel model described above. Since the rimless wheel model is defined in two-dimensional space and the robot exists in three-dimensional space, the high-level controller 216 determines 602 a plane on which the simplified rimless model resides. This determination is illustrated in FIG. 7. Generally, the robot controller 200 estimates that the robot will move in the same direction as the velocity of the robot CoM, $\dot{r}_G$, just after a push. Consequently, the GFPE will be located on the line of $\dot{r}_G$ projected on the ground. The two-dimensional plane 702 for the rimless wheel is therefore defined by two vectors: $\dot{r}_G$ and the vertical through the CoM. The magnitude and direction of the push do not necessarily need to be known in order to compute the GFPE. Rather, in one embodiment, the selected plane is solely dependent on the states of the robot (i.e., joint angles and velocities) after the push. In FIG. 7, P' is the actual CoP of the robot and P is the projected CoP located on the wheel plane about which the wheel rotates. The region enclosed by the dotted black lines is the support convex hull for the robot. The two feet of the robot are drawn disproportionally large in FIG. 7 to clearly show the convex hull and the points.

Referring back to FIG. 6, an anchor point is determined 604 upon the two-dimensional plane where the rimless wheel touches the ground and rotates about. Setting an appropriate anchor point is important since the robot has extended feet while the rimless wheel model has a point contact. The location of the anchor point affects the GFPE location and the decision for taking a step. In one embodiment, the projected CoP P is used as the anchor point, as shown in FIG. 7. The CoP P' of the robot is projected on the two-dimensional plane and it is approximated that the rimless wheel rotates about the projected CoP, P. For several reasons, the projected CoP may make a better anchor point than another possible choice, the ground projection of the CoM. First, the CoP better represents the state of the robot for the purpose of push recovery, in part because its computation includes acceleration. For example, just after a push from behind, the CoP will be ahead of the CoM as in FIG. 7. If the projected CoM is instead used as the anchor point, even a small push may result in a big step which may not be necessary at all. For instance, if the robot is pushed from behind and the projected CoM is used as the anchor point, the push may make the CoM of the rimless wheel pass over the vertical. This would imply that the robot would topple forward and stepping would become necessary. In contrast, if the projected CoP P is used as the anchor point and is ahead of the projected CoM, the kinetic energy from a small push would be dissipated before the CoM rotates and passes over the vertical line through the projected CoP P. This implies that no step is necessary since the robot would not topple forward from that small push.

A. Dynamics of Rimless Wheel Model

Figure 8:
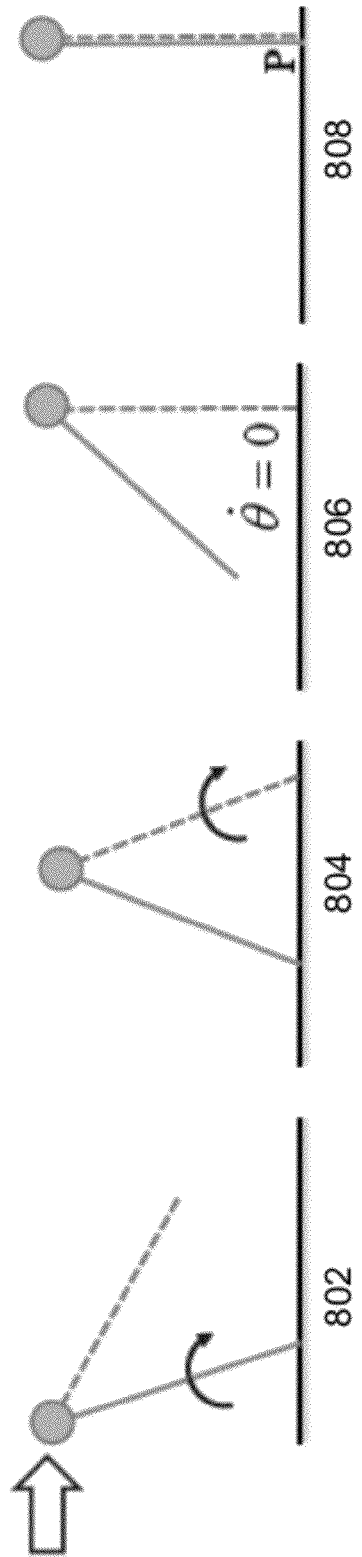
FIG. 8 is a diagram illustrating a various stepping phases of a rimless wheel model of a humanoid robot in accordance with an embodiment of the invention.

A dynamic model is then applied 606 to model motion of the rimless wheel based on the determined plane and anchor point. The rotational inertia of the rimless wheel model is equal to the rotational inertia of the robot about the anchor point P. FIG. 8 illustrates four stages of motion of a rimless wheel model modeling a push from behind. Although FIG. 8 illustrates a case where the ground is flat, the described model is also valid for general non-level ground.

In the first phase 802, the CoM is behind the anchor point but will pass over the anchor point since the robot has enough kinetic energy. In the second phase 804, the robot takes a step. In the third phase 806, the robot stops with the CoM above the foot contact. The fourth phase 808 models a follow-up step of the robot in which the swing spoke takes a step at the same step location of the support spoke. The first phase 802 and third phase 806 can be modeled as an inverted pendulum model. The second phase 804 is modeled as an instantaneous phase of collision where the wheel energy is lost. These models are discussed in further detail below.

Figure 9B:
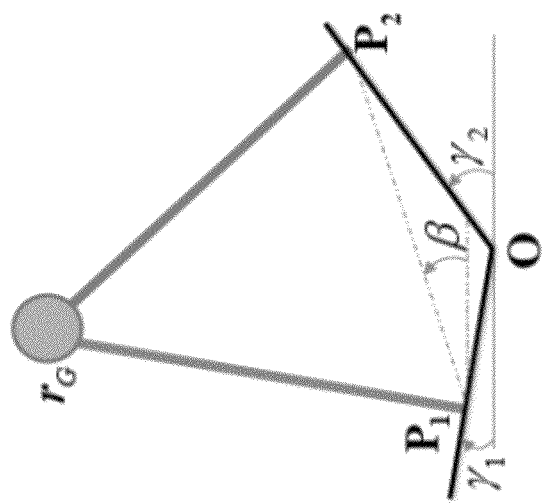
FIG. 9B is a diagram illustrating a rimless wheel model of a humanoid robot for a collision phase of a stepping motion accordance with an embodiment of the invention.
Figure 9A:
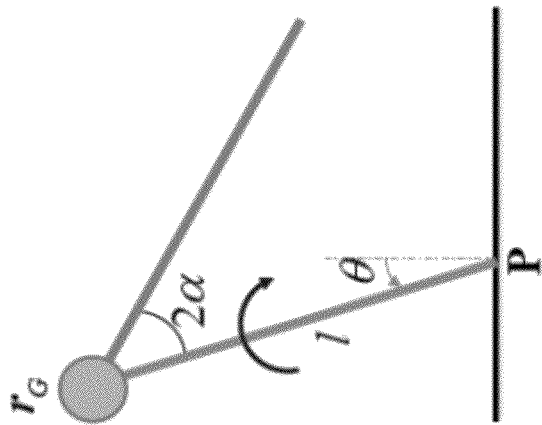
FIG. 9A is a diagram illustrating a rimless wheel model of a humanoid robot for a single support phase of a stepping motion in accordance with an embodiment of the invention.

FIG. 9A illustrates an inverted pendulum model modeling the first phase 802 and third phase 806 where only one of the support legs is in contact with the ground. The equation for motion is given by:

$$I_P \ddot{\theta} = mgl \sin \theta \quad (1)$$

where $\theta$ is the angle made by the support spoke and the vertical, $I_P$ is the rotational inertia of the rimless wheel about P, m is mass, g is the acceleration due to gravity, and l is the length of the support leg. Until stepping of the swing leg, the total mechanical energy E of the rimless wheel is conserved.

At time $t^-$ just before the touchdown collision of the second phase 804, the conservation of E leads to the following relationship:

$$\dot{\theta}(t^-) = \pm\sqrt{\frac{2}{I_p}(E - mgl\cos\alpha)} \quad (2)$$

since $\theta(t^-)=\alpha$, where $\alpha$ is the leg angle defined as the half-angle between the spokes. The sign of $\dot{\theta}(t^-)$ is decided by the initial condition. For example, in the convention of FIG. 9A, the sign is negative.

During the collision in the second phase 804 when the swing leg impacts the ground, the angular momentum $k_P$ is estimated as being conserved around the collision point. In other words, $$k_P(t^-) = k_P(t^+) \quad (3)$$

where $t^+$ is the time just after the collision. The collision results in an instantaneous loss of angular velocity. The angular velocity immediately after the collision is given by:

$$\dot{\theta}(t^+) = \dot{\theta}(t^-)\cos(2\alpha). \quad (4)$$

Based on this dynamic model, the GFPE is next determined for non-level ground.

B. Whether to Step on the Next Slope

If the ground is non-level with discrete slope change as shown in FIG. 9B, the robot determines 608 if it should take a step on the first slope or the second slope. Introducing the constants $d_1=P_1O$ and $d_2=OP_2$ where O is the point of intersection of the slopes, $P_1$ is the anchor point and $P_2$ is the touch-down location of the swing spoke on the second slope, the leg angle $\alpha_o$ for stepping on O is determined as follows:

$$2l\sin\alpha_o = d_1. \quad (5)$$

The robot should take a step on the second slope if any of the two following conditions are satisfied: (1) After the step at time $t^+$, when the pivoting spoke just detached from the first slope, $\theta(t^+)=\alpha-\gamma_1$ is negative. This means that the CoM has already crossed the vertical line through O; (2) Upon stepping at O, the kinetic energy is large enough for the robot to topple forward.

The first condition is purely geometric and it implies that:

$$\gamma_1 > \alpha_o. \quad (6)$$

When $\gamma_1 < \alpha_o$, the second condition is checked to see whether $\theta(0)$ is large enough for toppling. To satisfy the condition:

$$\dot{\theta}(0) > \sqrt{\frac{2mgl}{I_p}\left[\cos(\alpha+\gamma_1) - \cos\theta(0) + \frac{1-\cos(\alpha-\gamma_1)}{\cos^2(2\alpha)}\right]} \quad (7)$$

Eqs. (6) and (7) together are the conditions for the robot to take a step on the second slope.

In the simpler case, where the ground is flat, the robot need not explicitly make the determination in step 608, and this step can be omitted. However, the above equations can still be used where $\gamma_1=\gamma_2=0$.

C. Where to Step

The robot next determines 610 where to step. In the case of non-level ground where the conditions given by Eqs. (6) and (7) are satisfied, the robot takes a step on the second slope. In this case, the robot controller 100 determines the leg angle $\alpha$ which will stop the robot at the vertically upright configuration at the end of the stepping.

Figure 10B:
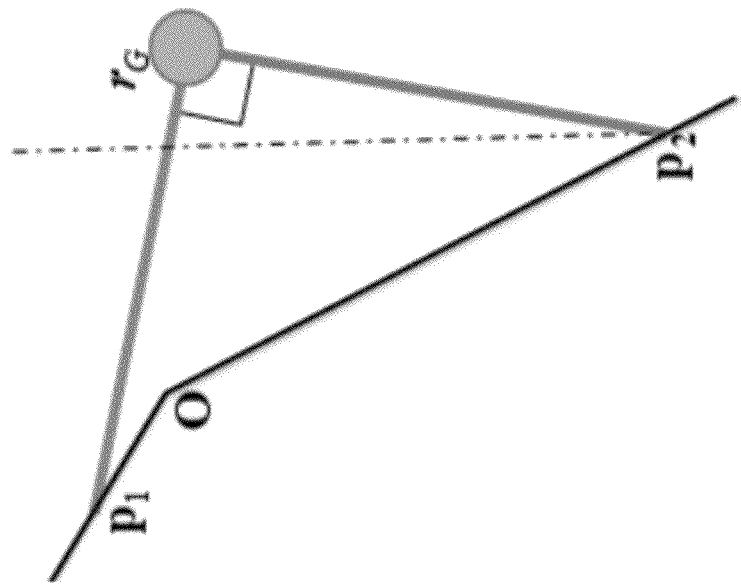
FIG. 10 is a diagram illustrating balance recovery boundary conditions of a humanoid robot using a rimless wheel model accordance with an embodiment of the invention.
Figure 10A:
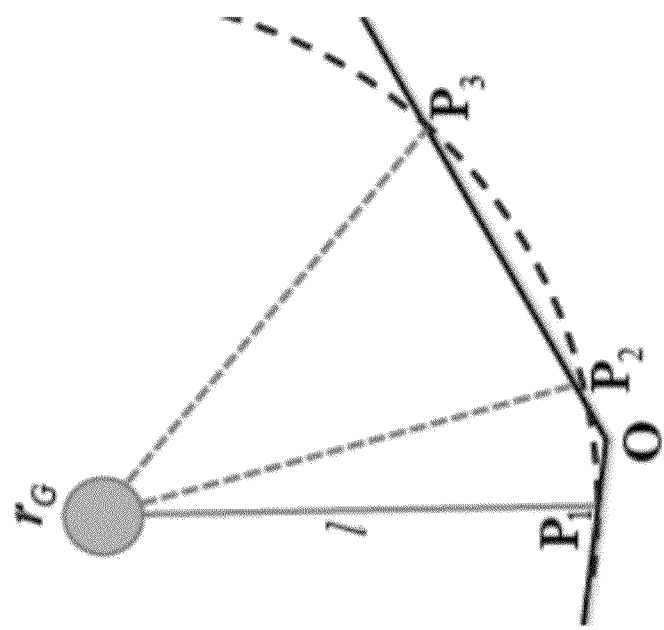

The robot controller 200 first checks the geometrically possible range of a given the initial configuration. This determination is illustrated in FIGS. 10A-B. FIG. 10A shows a first limiting case. Here, if the minimum distance from $r_G$ to the second slope is shorter than the spoke length l, the robot (based on the rimless wheel model) cannot physically step between the two points $P_2$ and $P_3$ in FIG. 10A which are the points of intersection of the l-radius circle centered at $r_G$ and the second slope. FIG. 10B shows a second limiting case. Here, even assuming a 90-degree $\alpha$, presumably the maximum leg angle, the robot still cannot stop toppling because of the steep ground slope. In most cases these limitations would not exist since the two cases imply an extreme situation such as when the slope is too steep or the robot has already fallen too much.

For the sake of convenience, the remaining description excludes the cases illustrated in FIGS. 10A-B. When the robot steps on the second slope as shown in FIG. 9B, the angle $\theta$ between the support spokes and the vertical line are:

$$\theta(t^-) = \alpha - \beta$$

$$\theta(t^+) = \alpha + \beta. \quad (8)$$

The distance from O to the stepping point, $P_2$ in FIG. 9B can be computed as:

$$d_2 = -d_1\cos(\gamma_1+\gamma_2) + \sqrt{4l^2\sin^2\alpha - d_1^2\sin^2(\gamma_1+\gamma_2)} \quad (9)$$

$\beta$ is given as:

$$\cos\beta = \frac{d_1\cos\gamma_1 + d_2\cos\gamma_2}{2l\sin\alpha} \quad (10)$$

$$\sin\beta = \frac{-d_1\sin\gamma_1 + d_2\sin\gamma_2}{2l\sin\alpha}.$$

Note that $d_2$ and $\beta$ are functions of $\alpha$ only.

After the step, the rimless wheel is expected to come to a complete stop. By virtue of conservation of energy between the third phase 806 and fourth phase 808 of FIG. 8, $\dot{\theta}(t^+)$ can be obtained as follows:

$$\dot{\theta}(t^+) = \pm\sqrt{\frac{2mgl}{I_p}[1 - \cos(\alpha+\beta)]}. \quad (11)$$

Combining Eqs. (4), (2) and (11), the following equation is obtained:

$$\cos(2\alpha)\sqrt{\frac{2}{I_p}(E - mgl\cos\alpha)} - \sqrt{\frac{2mgl}{I_p}[1 - \cos(\alpha+\beta)]} = 0. \quad (12)$$

Solving this equation numerically gives the leg angle $\alpha$ and corresponding stepping point for the GFPE.

In the simpler case, where the ground is flat ($\gamma_1=\gamma_2=0$), the equation above yields a simpler fifth-order polynomial equation for $\cos\alpha$:

$$4mgl(\cos\alpha)^5 + 4E(\cos\alpha)^4 - 4mgl(\cos\alpha)^3 - 4E(\cos\alpha)^2 n + 2mgl\cos\alpha + E - mgl = 0, \quad (13)$$

The physical limitation of a humanoid implies the boundary conditions for α as:

$$0 < \alpha < \frac{\pi}{4}. \tag{14}$$

Based on the description above, it can be shown that α for the GFPE exists between $\alpha_o$ and π/4. To illustrate this, it is observed that Equation (12) is continuous in α. For $\alpha=\alpha_o$, the left terms of Equation (12) are strictly positive since Equation (7) holds. (Note that $\beta=-\gamma_1$ when $\alpha=\alpha_o$.) For α=π/4, the left term of Equation (12) is strictly negative. Therefore, at least one α between $\alpha_o$ and π/4 satisfies Equation (12).

The above proof might seem counter-intuitive since one can ask if there is any case the robot topples again after taking the step because of large initial disturbance. The reason is that the rimless wheel model completely stops at the moment of the step where α=π/4, which yields the zero angular velocity in Eq. (4) regardless of the magnitude of E. This result comes from no slip condition and the inelastic collision model. In practice, if the initial disturbance is very large, a robot may experience slippage and the conservation of angular momentum during inelastic collision may not be realistic.

Furthermore, based on the description above, it can be shown that the solution to α is unique. To illustrate this, it can be shown that the total energy after the impact $E^+(\alpha)$ monotonically decreases with increasing α. Since the solution should satisfy $E^+(\alpha_1)=mgl$, there should be only one α for the energy. Given $\alpha_1$ and $\alpha_2$ where $\alpha_2>\alpha_1$, let $E^+(\alpha_1)$ and $E^+(\alpha_2)$ be the total energies after the impact. The energy difference can be computed as following:

$$E^+(\alpha_2)-E^+(\alpha_1)=mgl(\cos\alpha_2-\cos\alpha_1)(1-\cos^2(2\alpha_2)) \tag{15}$$

which is strictly negative when $\alpha_2>\alpha$ and $\alpha\in[0,\pi/4]$. Extension of this proof to the non-level ground is trivial when a solution exists.

D. Duration of Step

In an urgent situation like reactive stepping, the duration of stepping is an important parameter. One of the benefits from using the GFPE is that the robot can estimate the time during which the robot can take a step because the robot has dynamics and the stepping motion takes a certain amount of time. In addition, the duration of stepping is important also for the robot controller 200. If the estimated duration of step is too short for the robot to physically take a step, the robot controller 200 may switch to an emergency protocol such as fall-avoidance or damage minimization from fall, instead of trying to take a step. Since the robot is modeled as a two-dimensional inverted pendulum, an incomplete elliptic integral of the first kind is used to obtain the stepping duration.

E. Benefits of GFPE

There are several benefits to estimating a stepping point using GFPE as described above. First, GFPE is predictive. It yields a future stepping point and duration for the step. This contrasts with other foot placement estimators that are state-dependent, and therefore may result in the estimated point moving away by the time the robot takes the step. In addition, the GFPE exists on the non-level ground as long as the slopes change discretely. In contrast, prior foot placement estimators assume a flat ground and cannot make foot placement predictions for non-level ground.

Generalized Balance Control

A generalized balance control technique is now described for controlling motion of the robot. These general principles can be used to implement both the postural balance controller 212 and the step controller 214. In the postural balance controller 212, balance parameters described below are configured such that the robot will attempt to preserve its desired linear momentum over angular momentum, and is therefore likely to respond to an external perturbation by making a postural change to maintain balance. In the step controller 214, different parameters are configured such that the robot will instead respond to the push by taking a step to the GFPE location. In the step controller 214, the GFPE location therefore acts as an additional constraint on the robot's motion so that the robot will attempt to maintain its balance while stepping to the GFPE location.

Figure 11B:
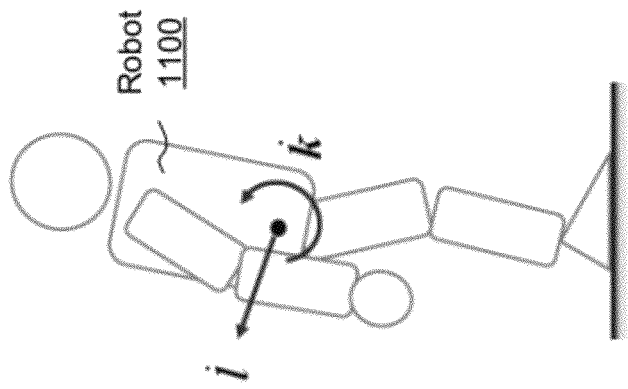
FIG. 11B is a free body diagram illustrating equivalent forces and moments on a center of mass of a humanoid robot in accordance with an embodiment of the invention.
Figure 11A:
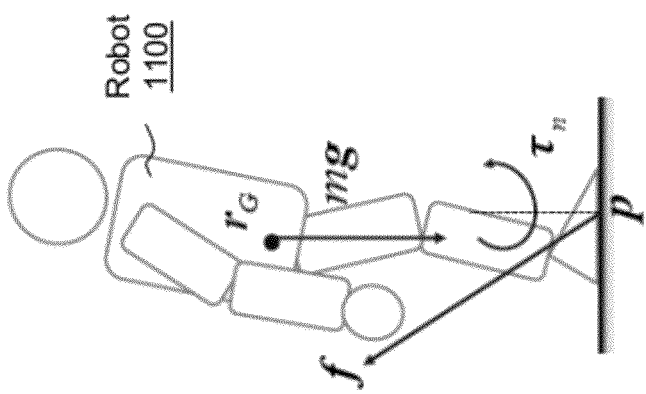
FIG. 11A is a free body diagram illustrating external forces and moments on a humanoid robot in accordance with an embodiment of the invention.

FIG. 11A is a free body diagram illustrating the external forces that act on a freely standing humanoid robot 1100. These include the ground reaction force (GRF) f, the Ground Reaction Moment $\tau_n$ normal to the ground, and the weight mg of the robot 1100, where m is the total robot mass and g is the acceleration due to gravity. The center of pressure (CoP) is located at a point p. According to D'Alembart's principle, the sum of external moments and external forces, respectively, are equivalent to the rates of changes of angular and linear momentum, respectively, of the robot 1100. The mathematical expression for these relationships are given by (16) and (17):

$$\dot{k}=(p-r_G)\times f+\tau_n \tag{16}$$

$$\dot{l}=mg+f \tag{17}$$

In the above equations, $r_G$ is the CoM location and p is the CoP location. Together k and l is a 6×1 vector called the spatial centroidal momentum $h=[k^T l^T]^T$. As used herein, the spatial centroidal momentum, h, may also be referred to as spatial momentum, or simply the momentum of the robot 1100.

FIG. 11B depicts the robot's rate of change of angular momentum about the CoM, $\dot{k}$, and linear momentum, $\dot{l}$, respectively. The (spatial) momentum rate change has a one-to-one relationship with the GRF and CoP. As can be seen from (16) and (17), the external forces illustrated in FIG. 11A are solely responsible for the centroidal momentum rate change illustrated in FIG. 11B. Specifically, $\dot{l}$ is completely determined by f and vice versa. Furthermore, the centroidal angular momentum rate change $\dot{k}$ is determined by both GRF f and the CoP location p. Conversely, the CoP location p depends on both $\dot{k}$ and $\dot{l}$. This implies that complete control of p requires control of both linear and angular momentum.

Using this fundamental mathematical relation, the robot controller 200 maintains balance of the robot by controlling both the linear and angular components of the spatial momentum. Specifically, in one embodiment, behavior of the robot controller 200 is defined in terms of the desired momentum rate change. Note that the desired momentum rate change may not always be physically realizable due to several constraints on the foot-ground contact. First, the CoP is constrained in that it cannot be located outside the robot's support base. In the single support case (i.e., the robot's feet are positioned such that they provide a single support), the support base is identical to the foot contact area, whereas in the double support case on level ground, the support base is equivalent to the convex hull of the support areas of the two feet. Second, the GRF must be unilateral in nature, and must not attract the robot towards the ground. Third, the GRF must satisfy the friction limit of the foot-ground surface, so as not to cause slip. Thus, the robot controller 200 determines the admissible or physically realizable values of the momentum rate change that are as close as possible to the desired values while satisfying the above physical constraints. Subsequently, whole body joints are controlled to generate the admissible momentum rate change.

Determination of GRF and CoP of Individual Foot

In order to generate the admissible momentum, the robot controls the external forces. Out of the three external forces shown in FIG. 11A, the gravity force g cannot be manipulated, and the effect of $\tau_n$ is typically small. Therefore, the GRF f assumes substantial importance in momentum control, and its magnitude, line of action and the point of application (i.e., the CoP) have unique effect on the momentum. Due to the one-to-one correspondence between momentum rate change and GRF-CoP pair, the desired GRF and CoP are directly determined from the desired spatial momentum rate change. For single support, the desired GRF and CoP uniquely define the contact force and its location on the support foot. However, for double support, there can be infinitely many combinations of contact forces at the two feet that can create the desired momentum rate change.

One way to resolve this redundancy during double support would be to determine the GRF and CoP first, and then distribute them to each foot. However, this approach has important drawbacks. First, when the feet are located on non-level and non-continuous surfaces, the CoP may not be defined. To check the feasibility of the GRF heuristic virtual level plane may be defined or, more generally, the 3D convex hulls made by the contact points may be computed. With this approach, it is difficult to handle the case where foot/ground friction is different for the two feet.

To avoid this problem, in one embodiment, the individual foot GRF and foot CoP are instead computed directly from the desired momentum rate change. Assuming planar contact between the ground and each foot, the foot GRF is the ground reaction force acting on an individual foot and foot CoP is the location where its line of action intersects the foot support plane. These are contrasted from the more traditional net GRF and the net CoP, which are applicable when the two feet are taken together during double support.

For the present-day humanoids, which are equipped with individual foot force sensors, the use of foot GRF and foot CoP is not only a choice of convenience, but a natural choice for balance control. The foot GRF and foot CoP are directly obtained as sensor data, whereas net GRF and net CoP are computed only as a subsequent step.

The non-uniqueness of foot GRF and foot CoP during double support allows for an additional optimality criterion in the solution. Specifically, the ankle torques may be minimized while generating the desired momentum rate change. As will be described in further detail below, this may be achieved by solving two simple constrained linear least-squares problems. Minimizing ankle torque is important because typically the ankle torque is more constrained than others in that it should not cause foot tipping.

The robot controller 200 controls both angular and linear momentum of the robot for balance maintenance. The control policy is defined in terms of the desired momentum, which allows for different control variations. Under different circumstances, the robot controller 200 can satisfy linear and angular momentum in different proportions as the situation demands. For example, using the same general control principles, the postural balance controller 212 is configured to preserve linear momentum in favor of making angular momentum changes. In contrast, the step controller 214 is configured to preserve angular momentum in favor of changing linear momentum by executing a step to the GFPE location. Desired foot GRF and foot CoP are directly computed without requiring the robot controller 200 to compute the net GRF and net CoP. Thus, the balance control framework is applicable to non-level ground at each foot without any special treatment. For double support, the robot controller 200 computes foot GRFs and foot CoPs that minimize the ankle torques.

Beneficially, the robot controller 200 generates a control signal 204 that enables a single or double-supported robot to maintain balance when subjected to pushing various directions. Furthermore, the robot can maintain balance when two feet are on separate moving supports with different inclinations and velocities. Furthermore, the robot controller 200 can be used for stepping motions.

Figure 12:
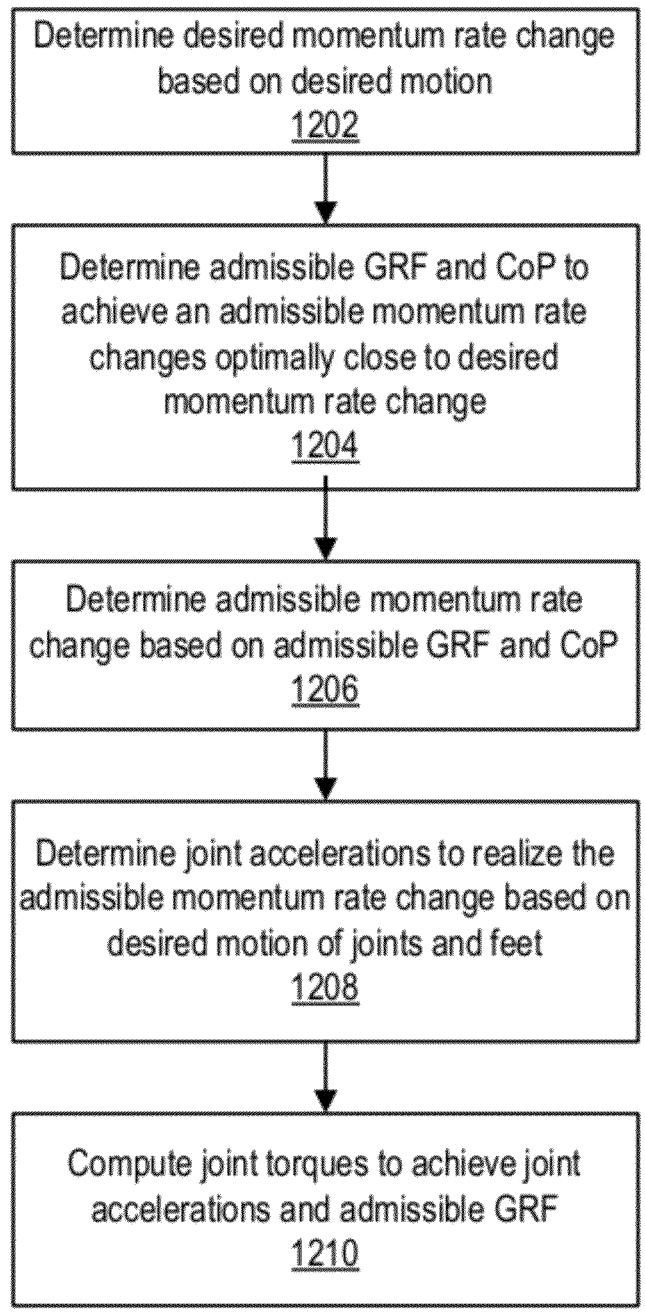
FIG. 12 is a flowchart illustrating a process for controlling a humanoid robot in accordance with an embodiment of the invention.

FIG. 12 is a flowchart illustrating the high-level process performed by the robot controller 200, details of which are described in further detail below. From the desired motion 202, the robot controller 200 determines 1202 desired angular momentum rate change $\dot{k}_d$ and desired linear momentum rate change $\dot{l}_d$ (collectively referred to herein as desired momentum rate change). In the case of the step controller, the desired linear momentum rate change $\dot{l}_d$ may include the linear momentum rate change $\dot{l}_d$ for enabling the robot to step to the determined GFPE location.

Next, the robot controller 200 determines 1204 admissible foot ground reaction forces (GRFs) and foot center of pressures (CoPs) from the desired momentum rate change. The admissible foot GRF and foot CoPs are constrained based on balance constraints (e.g., the admissible CoP may be constrained to the area under the support base or the robot may topple over). Thus, the admissible foot GRF and foot CoPs may not precisely result in the desired momentum rate change if the robot is not physically capable of producing the desired momentum rate change while still maintaining balance. Instead, the admissible foot GRF and foot CoPs result in an admissible momentum rate change that is optimally close to the desired momentum rate change under the imposed constraints. The admissible momentum rate change is determined 1206 from the admissible foot GRF and foot CoPs. The robot controller 200 determines 1208 joint accelerations that will achieve the admissible momentum rate change based on the desired motion of joints and feet. The robot controller 200 then determines 1210 joint torques to achieve the joint accelerations and the admissible foot GRF. Each of the process steps above are now described in further detail below.

A. Control Framework

The configuration of a humanoid robot may be represented as $Q=(T_0,\theta) \in SE(3) \times \mathbb{R}^n$ where $T_0=(R_0,p_0) \in SO(3) \times \mathbb{R}^3$ denotes the base frame (trunk) configuration and n is the total number of joint DoFs. The subscripts 0 and denote the base frame and joints, respectively, with s implying "shape" associated with the joint angles in geometric dynamics. The total DoFs of the robot is thus 6+n, because the floating base has 6 DoFs. The generalized velocity can be written as $\dot{q}=(v_0,\dot{\theta}) \in \mathbb{R}^{6+n}$ where $v_0=(\omega_0,v_0)$ is the spatial velocity of the trunk with respect to the body frame and expressed as:

$$[\omega_0]=R_0^T \dot{R}_0 \tag{18}$$

$$v_0=R_0^T \dot{p}_0 \tag{19}$$

Then, the constraint equations due to ground contacts and the joint space equations of motion of the robot are as follows:

$$0=J(Q)\dot{q} \tag{20}$$

$$\tau=H(Q)\ddot{q}+c(Q,\dot{q})+\tau_g(Q)-J^T f_c \tag{21}$$

where $\tau \in \mathbb{R}^{6+n}$ denotes the generalized forces, H is the joint space inertia matrix, c includes Coriolis, centrifugal, and damping forces, and $\tau_g$ is the gravity torque. $f_c$ is a vector representing external "constraint" forces from the ground, determined by foot GRFs and CoPs, and the Jacobian J transforms $f_c$ to the generalized forces. The dimension of $f_c$ depends on the nature of constraint at the foot-ground contact. For example, for single support $f_c$ is 6×1 (3 for force and 3 for torque) whereas for double support, when a non-slipping planar contact between the foot and the ground is maintained, it is 12×1.

Since the robot base is free floating, the first six elements of $\tau$ are zero, i.e., $\tau^T = [0^T \tau_s^T]$. Hence, (21) can be divided into two parts, one corresponding to the base, denoted by the subscript 0, and the other, subscripted with s, for the joints. Then (20) and (21) are rewritten as follows:

$$0 = J\ddot{q} + \dot{J}\dot{q} \tag{22}$$

$$0 = H_0\ddot{q} + c_0 + \tau_{g,0} - J_0^T f_c \tag{23}$$

$$\tau_s = H_s\ddot{q} + c_s + \tau_{g,s} - J_s^T f_c \tag{24}$$

where (22) is the differentiation of (20). In view of the framework above, the postural balance controller 112 determines the control torques $\tau_s$ to control dynamics of the robot and maintain balance.

Due to the high DoFs of humanoid robots, one embodiment of the postural balance controller 112 solves an optimization problem. However, the computational cost of the optimization increases rapidly as the dimension of the search space increases. Even the simplest optimization problem such as the least-squares problem has order $O(n^3)$ time complexity. Therefore, for improved computational efficiency, a sequential approach may be used. In this approach, the balance control problem is divided into smaller sub-problems, which can be solved serially. Moreover, by computing $f_c$ and $\ddot{q}$ first, an efficient linear-time algorithms for inverse dynamics can be used, without having to compute the joint space equations of motion (21) which has a quadratic time complexity.

B. Desired Momentum for Balance Controller

After receiving the desired motion 202, the robot controller 200 determines 1202 the desired angular and linear momentum rate changes $\dot{k}_d$ and $\dot{l}_d$. In various alternative embodiments, the desired rotational behavior may be defined in terms of the CoP instead of angular momentum. Although the GRF-CoP combination has a one-to-one relationship with momentum rate changes, their significance regarding balance are very different. Whereas the GRF and CoP characterize the magnitude, direction and point of application of the external forces, the momentum rate changes describe the resulting motion of a robot. The unilateral nature of robot-ground contact and friction limits impose important direct constraints on the range of GRF and CoP. These influence the achievable range of momentum rate change, but only indirectly. On the other hand, it is more natural to describe the aggregate motion of a robot in terms of momentum. Therefore, in the described embodiment, the controller 200 uses momentum as control objectives and uses GRF and CoP as constraints. The overall behavior of the robot against external perturbations is determined by the desired momentum rate change. In one embodiment, the robot controller 200 employs the following feedback control policy:

$$\dot{k}_d = \Gamma_{11}(k_d - k) \tag{25}$$

$$\dot{l}_d/m = \Gamma_{21}(\dot{r}_{G,d} - \dot{r}_G) + \Gamma_{22}(r_{G,d} - r_G) \tag{26}$$

where $\dot{k}_d$ and $\dot{l}_d$ are the desired rates of change of centroidal angular and linear momentum, respectively, m is the mass of the robot, $r_{G,d}$ is the desired CoM position, k is the actual angular momentum of the robot, $r_G$ is the actual CoM position of the robot, and $\dot{r}_G$ is the actual CoM velocity of the robot. $\Gamma_{ij}$ represents a 3×3 diagonal matrix of feedback gain parameters that may be experimentally determined.

The feedback parameters $\Gamma_{ij}$ vary between the postural balance controller 212 and the step controller 214 to achieve the different push recovery behaviors. For example, in the general framework described above, a small value of $\Gamma_{11}$ and large values of $\Gamma_{21}$, $\Gamma_{22}$ will generate the motion shown in FIG. 1A after a push from behind. In this case, postural balance controller 212 tries to respect linear momentum with higher priority over angular momentum. Normally the desired angular momentum is set to zero to keep the robot upright, and the bending motion generates angular momentum which contributes to the error in $k$. However, the generated angular momentum helps to pull the CoM backward and the small $\Gamma_{11}$ makes the controller almost ignore the angular momentum error. For example, in one embodiment the postural balance controller 212 uses gains $\Gamma_{11} = \text{diag}\{5, 5, 5\}$, $\Gamma_{21} = \text{diag}\{40, 20, 40\}$, and $\Gamma_{22} = \text{diag}\{8, 3, 8\}$.

On the other hand, the step controller 214 applies a large $\Gamma_{11}$ that causes the robot to respect angular momentum more strictly. When the desired angular momentum is zero, which is reasonable for stepping motion, the controller would move the robot CoM position rather than bend the upper body. The robot generates linear momentum by stepping to the GFPE location which causes error for $\dot{l}$. However the error is scaled down because of the small $\Gamma_{21}$ and $\Gamma_{22}$, and the robot controller 200 prioritizes the desired angular momentum over the desired linear momentum. In one embodiment, the step controller 214 uses gains $\Gamma_{11} = \text{diag}\{20, 20, 20\}$, $\Gamma_{21} = \text{diag}\{2, 2, 5\}$, and $\Gamma_{22} = \text{diag}\{3, 3, 8\}$.

Note that unlike the linear position feedback term in (26), there is no angular position feedback in (25). This is because a physically meaningful angular "position" cannot be defined corresponding to angular momentum. For postural balance maintenance experiments (i.e., the desired linear and angular momentum are zero and it is desired that the robot stands still), $k_d$ and $\dot{r}_{G,d}$ are set to zero and $r_{G,d}$ to the mid-point of the geometric centers of the two feet. For other cases where the robot is in motion, the desired motion 202 may include non-zero $k_d$ and $\dot{r}_{G,d}$.

Various sensors may be used to directly measure k, $r_G$, and $\dot{r}_G$, or the controller 200 may derive k, $r_G$, and $\dot{r}_G$ from other measurable quantities and known robot parameters (e.g., the mass and geometry of each link). For example, in one embodiment, each joint of the robot has a position encoder which supplies joint position data (e.g., joint angle) to the controller 200. The controller 200 may apply time differentiation to the joint position data to obtain joint velocities (e.g., angular velocities). Additionally, the robot's trunk may be equipped with an internal gyroscope and accelerometer. The gyroscope measures trunk angular velocity, which the controller 200 can integrate to obtain the trunk's angular position. The accelerometer generates linear acceleration of the trunk, which the controller 200 can integrate to obtain the trunk's linear velocity, and twice integrate to obtain the trunk's linear position. The controller 200 can compute k, $r_G$, and $\dot{r}_G$ from one or more the various types of sensed data. In alternative embodiments different types of sensors may be used to derive the measured quantities. For example, in one embodiment, the robot may be equipped with force sensitive skin that can directly measure applied forces, and these measured forces can be used to determine k, $r_G$, and $\dot{r}_G$.

In one embodiment, the robot also has a force sensor in each foot. Each force sensor measures the GRF, which includes three components of linear force and three components of torque. Alternatively, the controller 200 can compute GRF indirectly through the observed dynamics.

C. Admissible Foot GRF, Foot CoP, and Momentum Rate Change

Given the desired momentum rate changes, $\dot{k}_d$ and $\dot{l}_d$, the robot controller 200 determines 1204 admissible foot GRF and CoP such that the resulting momentum rate change (i.e., the admissible momentum rate change) is as close as possible to the desired values. A desired momentum rate change may not be admissible, for example, because it would require a desired CoP, $p_d$, that is outside the robot's support base, and attempting to implement the desired momentum rate change would therefore cause the robot to topple over. Furthermore, the GRF must be unilateral in nature, and must not attract the robot towards the ground. Furthermore, the robot may not be able to achieve desired momentum rate changes, $\dot{k}_d$ and $\dot{l}_d$ that are outside the robot's physical capabilities (e.g., if the desired momentum rate changes, $\dot{k}_d$ and $\dot{l}_d$ would require an actuator to produce a torque greater than it is capable of producing or a limb would be required to demonstrate a motion outside its physical range). Thus, the robot is constrained by its admissible CoP and its admissible GRF, which in turn may limit the desired momentum rate change to an admissible momentum rate change. The robot controller 200 determines the optimal foot GRF and foot CoP that will create the admissible momentum rate change, as close as possible to the desired momentum rate change.

1) Prioritization Between Linear and Angular Momentum

If the desired foot GRF and foot CoP are not admissible, it is not physically possible to generate the desired momentum rate changes and still maintain balance. In this case, the robot controller 200 may strike a compromise and determine whether to attempt to preserve $\dot{k}$ or $\dot{l}$ more strictly. When to postural balance controller 212 is used, the desired CoP location, $p_d$, is translated to the closest point of the support base resulting in an admissible CoP location, p. The magnitude and line of action of the desired GRF $f_d$ is unchanged in the resulting admissible GRF f. In this case the linear momentum objective of the desired motion 202 is satisfied (i.e., the CoM remains stationary) but the angular momentum objective is somewhat compromised. If the angular momentum was not compromised, the robot may topple over because the desired CoP location $p_d$ is outside the support base. The behavior emerging from this solution is characterized by a trunk rotation (see e.g., FIG. 1A). This strategy can be observed in the human when the trunk yields in the direction of the push to maintain balance.

In contrast, when the step controller 214 is used, in addition to translating the desired CoP, $p_d$, to the support base resulting in an admissible CoP, p, as before, the direction of the desired GRF $f_d$ can be rotated resulting in the admissible GRF f. Under this solution, the angular momentum objective is satisfied (i.e., the robot does not perform a trunk rotation), and the linear momentum is controlled to achieve a step to the GFPE location. In this case, the robot moves linearly along the direction of the applied force due to the residual linear momentum and prevents falling by taking the step (see, e.g., FIG. 1B).

2) Single Support Case:

Dealing with single support case is straightforward because the foot GRF and CoP are uniquely determined from the desired momentum rate change, from (16) and (17) as follows:

$$f_d = \dot{l}_d - mg \quad (27)$$

$$p_{d,X} = r_{G,X} - \frac{1}{\dot{l}_{d,Y} - mg}(f_{d,X} r_{G,Y} + \dot{k}_{d,Z}) \quad (28)$$

$$p_{d,Z} = r_{G,Z} - \frac{1}{\dot{l}_{d,Y} - mg}(f_{d,Z} r_{G,Y} + \dot{k}_{d,X}) \quad (29)$$

where the Y-axis is parallel to the direction of gravity vector, i.e., g=(0, g, 0). If $f_d$ and $p_d$ computed above are valid, these values are computed directly. Otherwise, as mentioned previously, the controller gives higher priority to linear momentum. If $f_d$ is outside the friction cone, $f_d$ is first projected onto the friction cone to prevent foot slipping.

Figure 13:
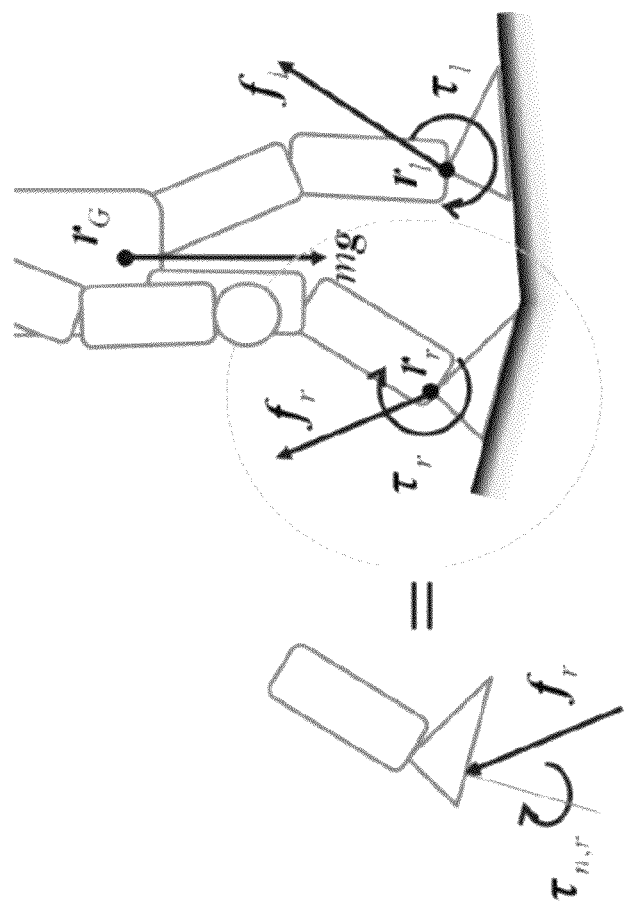
FIG. 13 is a free body diagram illustrating forces on feet of the robot in accordance with an embodiment of the invention.

3) Double Support Case:

Determining foot GRFs and foot CoPs for double support is more involved. (16) and (17) may be rewritten for the double support case. Here, the GRF at each foot is expressed in terms of the forces and torques applied to the corresponding ankle. A free body diagram illustrating this concept is shown in FIG. 13. By representing the GRF applied to each foot with respect to the local frame of the foot located at the ankle, the moments $\tau_r, \tau_l$ applied to the ankle by the foot GRFs $f_r$ and $f_l$ can be factored out. $r_r$ and $r_l$ are the positions of the ankles. The benefit of this representation is that the torques applied to the ankles may be explicitly expressed.

$$\dot{k} = \dot{k}_f + \dot{k}_\tau \quad (30)$$

$$\dot{k}_f = (r_r - r_G) \times f_r + (r_l - r_G) \times f_l \quad (31)$$

$$\dot{k}_\tau + \tau_r + \tau_l \quad (32)$$

$$\dot{l} = mg + f_r + f_l \quad (33)$$

In (30), $\dot{k}$ is divided into two parts: $\dot{k}_f$ due to the ankle force, and $\dot{k}_\tau$ due to ankle torque. Thus, ankle torques may be taken into account in determining foot GRFs. $f_r$ and $f_l$ are the GRFs at the right and left foot, respectively, and $r_r, r_l$ are the positions of the body frames of the foot, located at the respective ankle joints. The ankle torques $\tau_i$, (i=r,l) are expressed in terms of foot GRF and foot CoP as follows:

$$\tau_i = R_i(d_i \times f_i + \tau_{n,i}) \quad (34)$$

where $R_i$ is the orientation of the foot, $d_i$ is the foot CoP in body frame, and $\tau_{n,i} = (0, 0, \tau_{n,i})$ is the normal torque in body frame.

Figure 14:
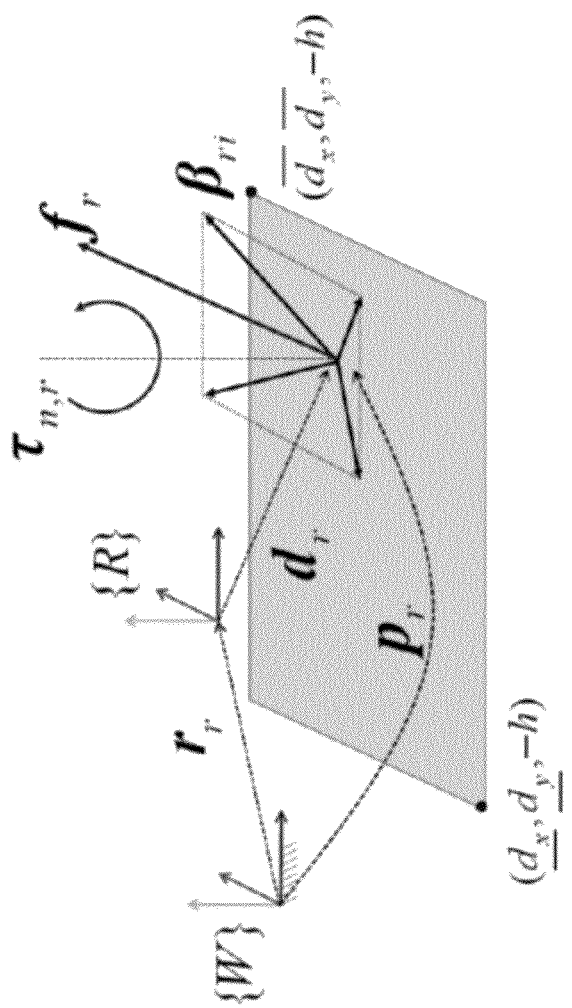
FIG. 14 is a diagram illustrating a representation of forces applied to the feet of the robot in accordance with an embodiment of the invention.

A diagram illustrating this representation is shown in FIG. 14. The pressure from the ground to the right foot is representing using CoP, denoted by $d_r$ in the right foot frame $\{R\}$, a vertical moment $\tau_{v,r}$, and the GRF $f_r$. $f_r$ is represented with four basis vectors $\beta_{rj}$ (j=1 ... 4) that approximate the friction cone of the ground, i.e., $f_r = \Sigma_j \beta_{rj} \rho_{rj}$, where $\rho_{rj}$ (≥0) is the magnitude in the direction of $\beta_{rj}$. Therefore, the ground pressure is defined by 7 parameters, $\{\rho_{r1}, \ldots, \rho_{r4}, d_{rx}, d_{ry}, m_{v,r}\}$. This representation is compact, having only one more parameter than the minimum (3 for force and 3 for torque), and constraint can be expressed in a very simple form for a rectangular convex hull of the foot sole, i.e., $\rho_{rj} \geq 0$, $\underline{d}_j \leq d_j \leq \overline{d}_j$ and $|\tau_n| \leq \mu f_{r,Z}$. $\mu$ is a friction coefficient and h is the height of foot frame from the foot sole.

Given $\dot{k}$ and $\dot{l}$, solving for foot GRFs and foot CoPs is an underdetermined problem. Thus, additional optimality criteria may be prescribed to find a solution. By incorporating minimal ankle torques into the optimal condition, the objective function can be expressed as follows:

$$w_l \|\dot{l}_d - \dot{l}(f_r, f_l)\|^2 + w_k \|\dot{k}_d - \dot{k}(f_r, f_l, \tau_r, \tau_l)\|^2 + w_f (\|f_r\|^2 + \|f_l\|^2) + w_\tau (\|\tau_r\|^2 + \|\tau_l\|^2)$$ (35)

s.t. $f_i$ and $\tau_i$ are admissible where the first two terms aim to achieve the desired momentum rate change, the third term regularizes foot GRFs, and the last term tries to minimize ankle torques. w's are weighting factors among the different objectives.

Due to the cross product form of $f_i$ and $d_i$ in (34), minimizing (35) is a nonlinear problem. For improved computational efficiency, one solution is to convert this general nonlinear optimization problem to easier ones that can be solved using least-squares or quadratic programming methods. This can be achieved by expressing the foot GRF and foot CoP using the forces at sample contact points. However, a trade-off to this approach is that it increases the dimension of the search space significantly. For example, in one in one embodiment, GRF and CoP of one can be modeled using 16 variables to model the GRF and CoP of one foot, which is 10 more variables than the dimension of the unknowns.

Alternatively, instead of increasing the search space to make the optimization problem easier, (35) can be approximated with two constrained least-squares problems, one for determining the foot GRFs, and the other for determining the foot CoPs. This way the number of variables is kept small. Additionally, the ankle torques may be minimized. Minimizing ankle torques is meaningful because they are limited more severely than other joint torques due to the unilateral nature of contact. In order to minimize the ankle torques ($\dot{k}_\tau \to 0$), the foot GRFs $f_r$ and $f_l$ should create $\dot{k}_f$ as close to the desired angular momentum rate change ($\dot{k}_f \neq \dot{k}_d$) as possible while satisfying $\dot{l}_d$. If $\dot{k}_f = \dot{k}_d$, the ankle torques can vanish. If $\dot{k}_f \neq \dot{k}_d$, the ankle torques are determined to account for the residual angular momentum rate change, $\dot{k}_d - \dot{k}_f$.

a) Determination of Foot GRFs

The solution to the optimization problem below yields the foot GRFs, $f_r$ and $f_l$:

$$\min \|\dot{l}_d - \dot{l}(f_r, f_l)\|^2 + w \|\dot{k}_d - \dot{k}_f(f_r, f_l)\|^2 + \epsilon (\|f_r\|^2 + \|f_l\|^2)$$ (36)

where w and $\epsilon$ (w>>$\epsilon$>0) are weighting factors for angular momentum and the magnitude of foot GRFs, respectively that may be experimentally determined. For example, in one embodiment, w=0.1 and $Df$=0.01. Note that if $\dot{k}_d = \dot{k}_f$, the ankle torques $\tau_i$ become zero. Each foot GRF is modeled using four basis vectors $\beta_{ij}$ and their magnitudes $\rho_{ij}$ that approximate the friction cone (an inverted pyramid in FIG. 14) on the ground:

$$f_i = \sum_{j=1}^{4} \beta_{ij} \rho_{ij} := \beta_i \rho_i$$ (37)

where $\beta_i = [\beta_{i1} \ldots \beta_{i4}]$.

Note that $r_r$ and $r_l$ are determined by the configuration of the robot; they are constants when solving this problem. Therefore $\dot{k}_f$ becomes a linear equation of $\rho_i$ when (37) is substituted into (31). Rearranging into a matrix equation, the optimization problem (36) is turned into a linear least squares problem with non-negativity constraints where the only unknowns are the $\rho_i$:

$$\min \|\Phi \rho - \xi\|^2 \text{ s.t. } \rho_i > 0$$ (38)

where:

$$\Phi = \begin{bmatrix} \beta_r & \beta_l \\ w\delta_r & w\delta_l \\ & \epsilon 1 \end{bmatrix}, \xi = \begin{bmatrix} \dot{l}_d - mg \\ w\dot{k}_d \\ 0 \end{bmatrix}$$ (39)

$$\rho = [\rho_r^T \rho_l^T]$$ (40)

$$\delta_i [r_i - r_G] \beta_i$$ (41)

(38) can be solved using a Non-Negative Least-Squares algorithm, which has the merit of not requiring parameter tuning.

b) Determination of Foot CoPs

Usually, the desired angular momentum rate change cannot be generated only by $f_r$ and $f_l$, so the residual $\dot{k}_{\tau,d} = \dot{k}_d - \dot{k}_f$, should be generated by the ankle torques. To this end, local CoP of each foot is determined such that they create $\dot{k}_{\tau,d}$ while minimizing each ankle torque. It is to be noted that, after fixing $f_i$, (19) can be written as a linear function of $d_i$ and $\tau_{n,i}$:

$$T_i [-f_i] R_i d_i + R_i \tau_{n,i}$$ (42)

so that the optimization problem can be expressed as a least squares problem with upper and lower constraints:

$$\min \|\Psi \eta - k\|^2 \text{ s.t. } \underline{\eta} \leq \eta \leq \overline{\eta}$$ (43)

where $$\Psi = \begin{bmatrix} \Psi_k \\ \epsilon 1 \end{bmatrix}, \kappa = \begin{bmatrix} \dot{k}_{\tau,d} \\ \epsilon \eta_d \end{bmatrix}$$ (44)

$$\eta = [d_{r,x} \; d_{r,y} \; \tau_{n,r} \; d_{l,x} \; d_{l,y} \; \tau_{n,l}]^T$$ (45)

where the elements of the constant matrix $\Psi_k \tau \mathbb{R}^{3 \times 6}$ are determined from (42). $\underline{\eta}$ and $\overline{\eta}$ are determined from foot geometry, friction coefficient, and the normal component of foot GRF as illustrated in FIG. 5. $\eta_d$ is chosen such that $T_i$ is zero, i.e., the line of action of $f_i$ intersects the ankle. Eq. (43) may be solved using an appropriate method, such as, for example, the Levenberg-Marquardt method, or other known methods. Note that both the least squares problems have a small number of variables, so the optimization can be carried out quickly.

4) Admissible Momentum Rate Change:

After determining admissible foot GRF and foot CoP, the admissible momentum rate change $\dot{h}_a$ is also computed using (16) and (17), or (30) and (33) for double support.

D. Determination of Joint Accelerations and Torques

After determining the admissible foot GRFs, foot CoPs, and momentum rate change, the robot controller 200 determines 1108 the joint accelerations that will generate the admissible momentum rate change as well as the foot contact constraints.

First, the desired joint accelerations $\ddot{q}$ are resolved for balance such that they satisfy (22) and a variation of (23). The spatial centroidal momentum $h = [k^T l^T]^T$ can be expressed in terms of the generalized velocities:

$$h = A(Q)\dot{d}$$ (46)

where $A \in \mathbb{R}^{6 \times (6+n)}$ is the centroidal momentum matrix that linearly maps the generalized velocities to the spatial momentum. Differentiating (46), derives:

$$\dot{h} = A\ddot{q} + \dot{A}\dot{d}$$ (47)

After replacing $\dot{h}$ with external forces using Newton's law (refer to (16) and (17)), the aggregate motion of the dynamic system due to the external forces is expressed, which is the same as what (23) represents (note that the joint torques are not included in (23)). The only difference is the reference frame: (47) is expressed with respect to a frame at the CoM whereas (23) is written with respect to the base frame.

In this embodiment, (47) is used because the balance controller defines its objectives in terms of centroidal momentum. Specifically, the robot controller 200 computes the output accelerations $\ddot{\theta}_a$ such that they minimize the following objective function:

$$w\|\dot{h}_a - A\ddot{q} - \dot{A}\dot{q}\| + (1-w)\|\ddot{\theta}_d - \ddot{\theta}\| \qquad (48)$$

$$\text{s.t. } J\ddot{q} + \dot{J}\dot{q} = a_d$$

where $\dot{h}_a$ is the admissible momentum rate change and $\theta_d$ specifies the desired joint acceleration, which may describe the desired motions of the upper body. The parameter w controls the relative importance between the balance objective (the first term) and the prescribed motion objective associated with the kinematic task (the second term). $a_d = [a_{d,r}^T \alpha_{d,l}^T]^T$ is the desired accelerations of the right and left feet, which will be described in further detail below.

Overall, (48) can be viewed as an inverse kinematics problem with three task objectives: momentum rate change, style, and contact constraints. By treating (22) as a hard constraint, it has a higher priority over the others. (48) is solved by converting it to a least-squares problem with linear equality constraints.

Finally, the feedforward torque input $\tau_{ff}$ is computed from $\ddot{\theta}_a$ and the admissible external forces by performing inverse dynamics. In one embodiment, the hybrid system dynamics algorithms may be used, which is useful for performing inverse dynamics for floating base mechanisms. Since external forces are explicitly specified for all the links contacting the ground, the robot can be treated as an open loop system even when multiple links are in contact with the ground, thereby making it possible to use the inverse dynamics algorithm for open-loop systems.

Overall torque input is determined by adding feedback terms:

$$\tau_s = \tau_{ff} + \tau_{fb} \qquad (49)$$

where $\Gamma_p = \text{diag}(\gamma_{p,i})$ and $\Gamma_d = \text{diag}(\gamma_{d,i})$ are proportional and derivative gains, respectively. Position and velocity commands $\theta^*$, $\dot{\theta}^*$ are determined from the time integration of $\ddot{\theta}_a$.

E. Desired Motion of the Feet

As described above, the desired motion of the feet acts as an input to the balance controller. In one embodiment, the desired foot accelerations $a_d$ are set such that each foot has the desired configuration $T_d \in SE(3)$ and velocity $v_d \in se(3)$. Specifically, for each foot, zwe use the following feedback rule:

$$a_{d,i} = k_p \log(T_i^{-1} T_{d,i}) + k_d(v_{d,i} - v_i) \qquad (50)$$

for $i \in \{r,l\}$ where $k_p$ and $k_d$ are proportional and derivative feedback gains, respectively. The log: $SE(3) \rightarrow se(3)$ function computes the twist coordinates corresponding to a transformation matrix. The configuration T and velocity v of a foot can be computed from the forward kinematics operation assuming that the robot can estimate the configuration and velocity of the trunk, e.g., from an accelerometer and a gyroscope. For a stationary support foot, the values can be trivially set as $v_d = 0_{=0}$ and $T_d = T$.

Thus, the robot controller 200 controls a humanoid robot to maintain balance on non-level, non-continuous, and non-stationary grounds. By controlling both linear and angular momentum of the robot, the robot controller 200 allows the robot to maintain balance under relatively large perturbations and respond to such perturbations with human-like balancing behavior. By determining the CoP and GRF at each support foot without using the traditional net CoP and net GRF of the robot, the robot controller 200 can deal with different ground geometry and ground frictions at each foot.

Trajectories for Stepping Control

Figure 15:
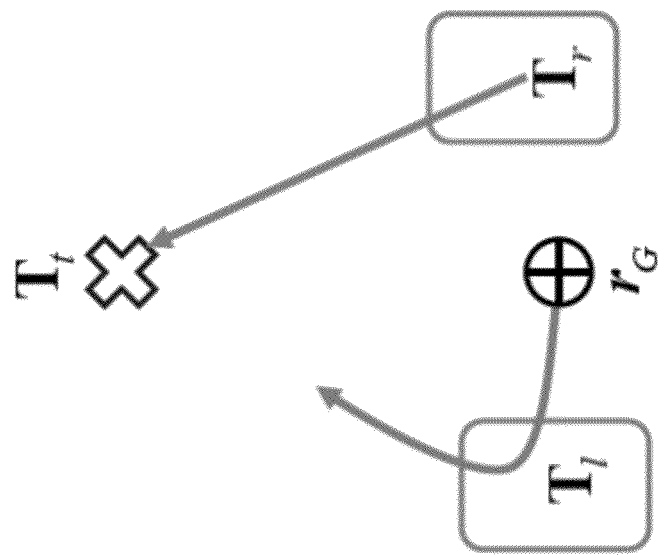
FIG. 15 is a diagram illustrating example trajectories for a stepping motion in accordance with an embodiment of the invention.

When the step controller 214 controls the robot to take a step, trajectories are determined for the CoM and the swing foot given the determined GFPE. FIG. 15 illustrates example trajectories of the robot's CoM, $r_G$, and swing foot $T_r$. The CoM trajectory is a reference for the rate change of linear momentum (Eq. 17), and the swing foot trajectory is one of the optimization goals in the balance control technique described above. In one embodiment, each trajectory is a quadratic Bezier curve defined as:

$$T = (1-t)^2 T_0 + 2(1-t)t T_1 + t^2 T_2, t \in [0,1] \qquad (51)$$

The planar CoM trajectory uses current CoM, $r_G$, pivot foot position $T_l$ and the half-way between the pivot foot and the target stepping point $$\frac{T_l + T_t}{2}$$

where $T_l$ is a pivot foot position, $T_r$ is a swing foot position, and $T_t$ is a target stepping point for the swing foot. The reason for using the center of the pivot foot is to achieve the CoP moving inside of the pivot foot print so that a robot can make a stable step. The height of CoM trajectory can be designed by modeling a robot as a rimless wheel model on the slope. The swing foot trajectory uses $T_r$, slightly lifted $T_r$ and $T_t$. For smooth motion, velocities of the trajectories are parameterized so that it has zero velocity at the start and the end. The duration of the trajectory comes from the duration of stepping multiplied by a safety factor (70%) considering the discrepancy between the simplified model and the real humanoid.

Applications of the Balance Controller

Figure 16A:
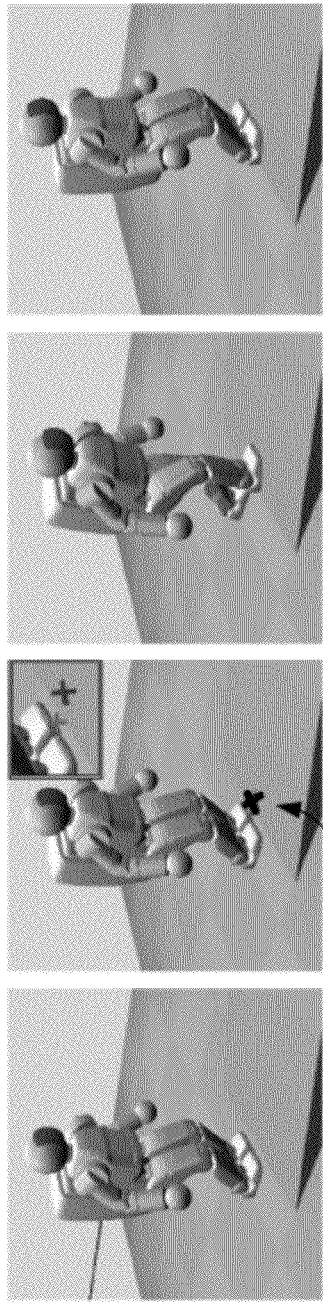
FIG. 16A is a diagram illustrating a response of the robot to maintain balance following push from behind on uphill terrain in accordance with an embodiment of the invention.
Figure 16B:
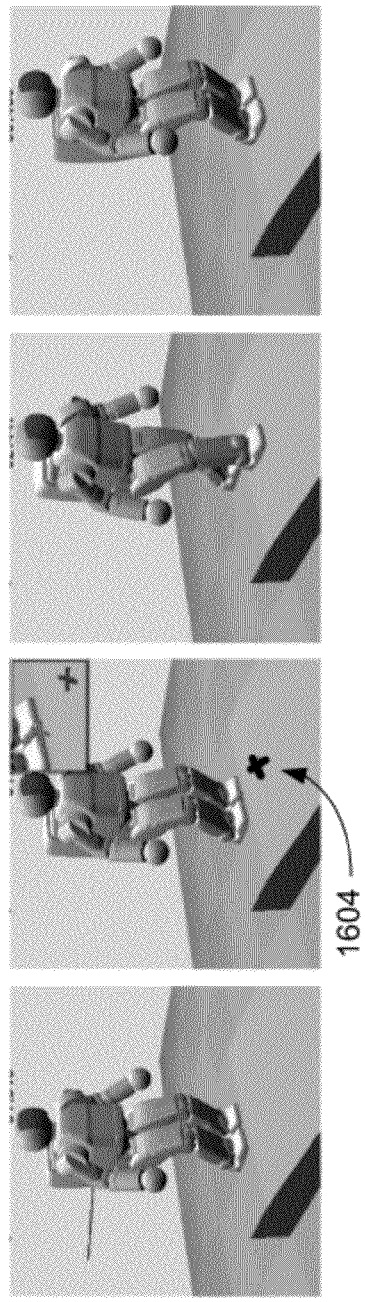
FIG. 16B is a diagram illustrating a response of the robot to maintain balance following push from behind on downhill terrain in accordance with an embodiment of the invention.

Applying the control framework above, the robot controller 200 is able to control the robot to maintain balance in response to a push. FIGS. 16A-16B illustrate motion of the robot when subjected to various perturbations and/or when standing on non-level or non-stationary supports. In each of these examples, the initial desired motion 202 of the robot is stationary, but the robot decides to take a step in response to a push. In FIG. 16A, for example, the robot is subjected to a push from behind when standing in front of uphill sloping ground. In response to the push, the robot determines a GFPE location 1602 indicated by the cross. Because the GFPE location 1602 is determined to be outside of the foot, the robot takes a step to maintain balance. FIG. 16B illustrates a similar situation for downhill sloping ground. Due to the downhill slope, the GFPE 1604 is further away from the robot, thereby causing the robot to take a bigger step.

ADDITIONAL ALTERNATIVE EMBODIMENTS

Using the unified framework for push recovery on level and non-level ground described above, the robot can maintain balance in response to external disturbances such as a push by selectively using momentum-based postural balance control and reactive stepping. By switching By switching between controllers for respecting linear momentum and angular momentum, a biped robot can choose to take a step or rebalance without stepping according to the magnitude of external disturbance. The GFPE beneficially provides a stepping location for stepping on non-level ground. Desirable properties of the GFPE include: 1) The point is predictive so that the controller may start stepping early. 2) The point may exist on the non-level ground while many previously proposed reference points for stepping do not. 3) Computation of the point yields both the time required for stepping as well as the location of the point itself.

Upon reading this disclosure, those of skill in the art will appreciate still additional alternative designs for a robot controller, a having the features described herein. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A computer-implemented method for controlling a humanoid robot in response to an external disturbance, the robot standing on a first section of non-level ground having a first slope and within stepping range of a second section of the non-level ground having a second slope, the method comprising:
   receiving, by a robot controller, state information of a humanoid robot;
   determining, by the robot controller, whether to step on the first section or the second section of the non-level ground and determining a predicted stepping location of the robot on the first or second section of the non-level ground, the predicted stepping location based on the state information of the humanoid robot and the first and second slopes, the predicted stepping location comprising a location such that the humanoid robot will maintain balance if it steps to the predicted stepping location;
   responsive to the predicted stepping location falling within a predefined region, controlling the robot to make a postural change without stepping to maintain balance in response to the external disturbance; and
   responsive to the predicted stepping location falling outside the predefined region, controlling the robot to take a step to the predicted stepping location to maintain balance in response to the external disturbance.

2. The computer-implemented method of claim 1, wherein determining the predicted stepping location comprises:
   modeling the humanoid robot as a rimless wheel model representing a first leg and a second leg of a same length, the rimless wheel model having a point mass corresponding to the center of mass of the humanoid robot, a first spoke corresponding to the first leg of the humanoid robot, and a second spoke corresponding to the second leg of the humanoid robot.

3. The computer-implemented method of claim 2, wherein determining the predicted stepping location comprises:
   determining a plane on which the rimless wheel model resides;
   determining an anchor point for the rimless wheel model;
   applying a dynamic model to model motion of the rimless wheel through the plane about the anchor point; and
   determining, based on the modeled motion, the stepping location as a point on the ground surface where the rimless wheel model will come to a stop with the point mass above the stepping location.

4. The computer-implemented method of claim 1, wherein controlling the humanoid robot to make a postural change comprises:
   determining desired rates of change of linear and angular momentum of the robot based on the desired motion;
   determining admissible rates of change of linear and angular momentum based on the desired rates of change and physical limitations of the humanoid robot for balance maintenance, wherein the desired rate of change of linear momentum is respected with preference over the desired rate of change of angular momentum;
   generating, by the balance controller, a control output indicating joint torques for achieving the admissible rates of change of linear and angular momentum; and
   outputting, by the balance controller, the control output to joint actuators, the joint actuators causing the robot to move according to joint torques.

5. The computer-implemented method of claim 1, wherein controlling the humanoid robot to take the step to the predicted stepping location comprises:
   determining desired rates of change of linear and angular momentum of the robot based on the desired motion and to achieve a step to the predicted stepping location;
   determining admissible rates of change of linear and angular momentum based on the desired rates of change and physical limitations of the humanoid robot for balance maintenance, wherein the desired rate of change of angular momentum is respected with preference over the desired rate of change of linear momentum;
   generating, by the balance controller, a control output indicating joint torques for achieving the admissible rates of change of linear and angular momentum; and
   outputting, by the balance controller, the control output to joint actuators, the joint actuators causing the robot to move according to joint torques.

6. The computer-implemented method of claim 5, further comprising:
   determining a trajectory of a center of mass of the humanoid robot; and
   determining a trajectory for a swing foot of the robot executing the step to the predicted stepping location.

7. A non-transitory computer-readable storage medium for storing computer program instructions for controlling a humanoid robot in response to an external disturbance, the robot standing on a first section of non-level ground having a first slope and within stepping range of a second section of the non-level ground having a second slope, the program instructions when executed by a processor cause the processor to perform steps including:
   receiving, by a robot controller, state information of the humanoid robot;
   determining, by the robot controller, whether to step on the first section or the second section of the non-level ground and determining a predicted stepping location of the robot on the first or second section of the non-level ground, the predicted stepping location based on the state information of the humanoid robot and the first and second slopes, the predicted stepping location comprising a location such that the humanoid robot will maintain balance if it steps to the predicted stepping location;
   responsive to the predicted stepping location falling within a predefined region, controlling the robot to make a postural change without stepping to maintain balance in response to the external disturbance; and responsive to the predicted stepping location falling outside the predefined region, controlling the robot to take a step to the predicted stepping location to maintain balance in response to the external disturbance.

8. The non-transitory computer-readable storage medium of claim 7, wherein determining the predicted stepping location comprises:
modeling the humanoid robot as a rimless wheel model representing a first leg and a second leg of a same length, the rimless wheel model having a point mass corresponding to the center of mass of the humanoid robot, a first spoke corresponding to the first leg of the humanoid robot, and a second spoke corresponding to the second leg of the humanoid robot.

9. The non-transitory computer-readable storage medium of claim 8, wherein determining the predicted stepping location comprises:
determining a plane on which the rimless wheel model resides;
determining an anchor point for the rimless wheel model;
applying a dynamic model to model motion of the rimless wheel through the plane about the anchor point; and
determining, based on the modeled motion, the stepping location as a point on the ground surface where the rimless wheel model will come to a stop with the point mass above the stepping location.

10. The non-transitory computer-readable storage medium of claim 7, wherein controlling the humanoid robot to make a postural change comprises:
determining desired rates of change of linear and angular momentum of the robot based on the desired motion;
determining admissible rates of change of linear and angular momentum based on the desired rates of change and physical limitations of the humanoid robot for balance maintenance, wherein the desired rate of change of linear momentum is respected with preference over the desired rate of change of angular momentum;
generating, by the balance controller, a control output indicating joint torques for achieving the admissible rates of change of linear and angular momentum; and
outputting, by the balance controller, the control output to joint actuators, the joint actuators causing the robot to move according to joint torques.

11. The non-transitory computer-readable storage medium of claim 7, wherein controlling the humanoid robot to take the step to the predicted stepping location comprises:
determining desired rates of change of linear and angular momentum of the robot based on the desired motion and to achieve a step to the predicted stepping location;
determining admissible rates of change of linear and angular momentum based on the desired rates of change and physical limitations of the humanoid robot for balance maintenance, wherein the desired rate of change of angular momentum is respected with preference over the desired rate of change of linear momentum;
generating, by the balance controller, a control output indicating joint torques for achieving the admissible rates of change of linear and angular momentum; and
outputting, by the balance controller, the control output to joint actuators, the joint actuators causing the robot to move according to joint torques.

12. The non-transitory computer-readable storage medium of claim 11, further comprising:
determining a trajectory of a center of mass of the humanoid robot; and
determining a trajectory for a swing foot of the robot executing the step to the predicted stepping location.

13. A computer-implemented method for determining a stepping location on non-level ground for a humanoid robot in response to an external disturbance, the method comprising:
modeling the humanoid robot as a rimless wheel model, the rimless wheel model having a point mass corresponding to the center of mass of the humanoid robot, a first spoke corresponding to a first leg of the humanoid robot, and a second spoke corresponding to a second leg of the humanoid robot;
determining a plane on which the rimless wheel model resides based on a direction of the humanoid robot's center of mass projected onto the non-level ground;
determining an anchor point for the rimless wheel model based on the center of pressure of the humanoid robot;
applying a dynamic model to model motion of the rimless wheel through the plane about the anchor point;
selecting, based on the modeled motion, which of a first section of the non-level ground and a second section of non-level ground to step to, the first section of the non-level ground having a first slope and the second section of the non-level ground having a second slope; and
determining the stepping location on the selected section of the non-level ground above which the point mass of the rimless wheel model will come to rest after executing the modeled motion.

14. The method of claim 13, wherein determining the stepping location comprises:
determining a possible range of stepping locations based on physical limitations of the robot; and
determining the stepping location within the possible range.

15. The method of claim 13, further comprising:
determining a leg angle of the humanoid robot to achieve a step to the stepping location; and
determining a duration of time to complete the step to the stepping location.

16. The method of claim 13, wherein applying the dynamic model comprises:
applying a first model to model a first phase of a stepping motion where the humanoid robot balances on a support leg while stepping with a swing leg, the first model modeling the humanoid robot as an inverted pendulum; and
applying a second model to model a second phase of the stepping motion where the swing leg impacts the non-level ground, the second model modeling an instantaneous collision between the swing leg and the non-level ground.

* * * * *